May 17, 1960 W. B. BARNES 2,936,648
TRANSMISSION AND CONTROL THEREFOR
Filed July 22, 1940 9 Sheets-Sheet 1
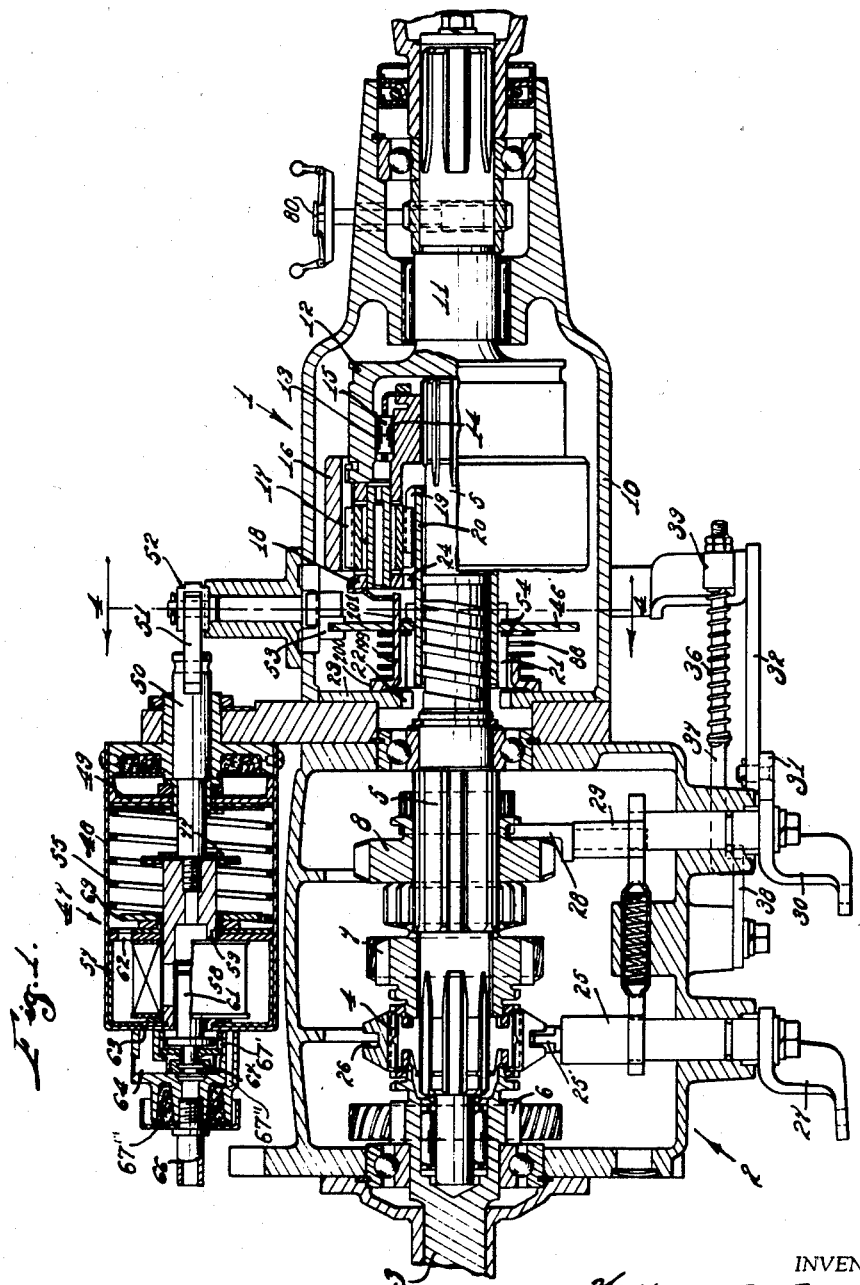
INVENTOR.
William B. Barnes,
BY Hood & Hahn.
ATTORNEYS.

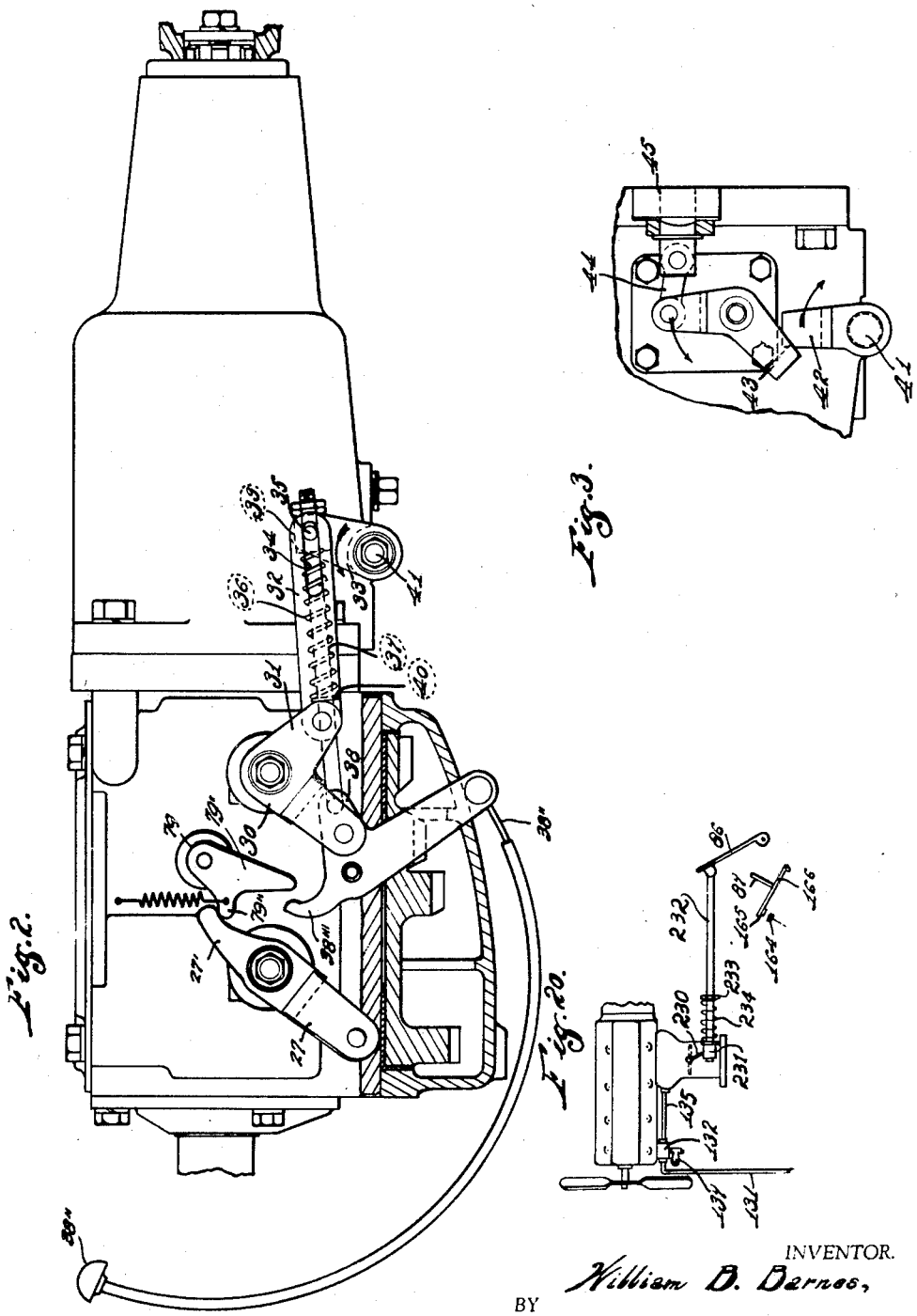

May 17, 1960 W. B. BARNES 2,936,648
TRANSMISSION AND CONTROL THEREFOR
Filed July 22, 1940 9 Sheets-Sheet 3

INVENTOR.
William B. Barnes,
BY
Hood & Hahn
ATTORNEYS.

May 17, 1960 W. B. BARNES 2,936,648
TRANSMISSION AND CONTROL THEREFOR
Filed July 22, 1940 9 Sheets-Sheet 4
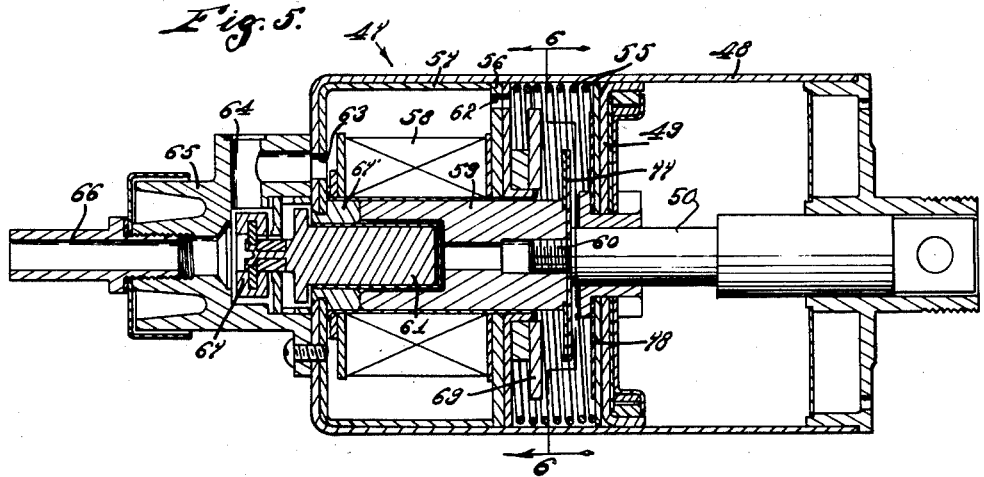
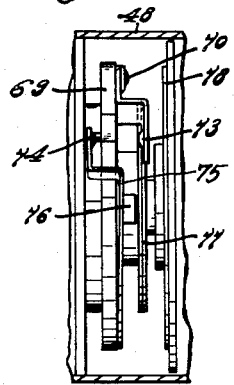
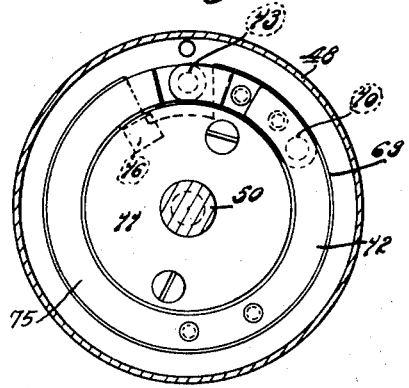
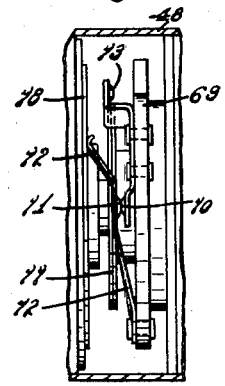
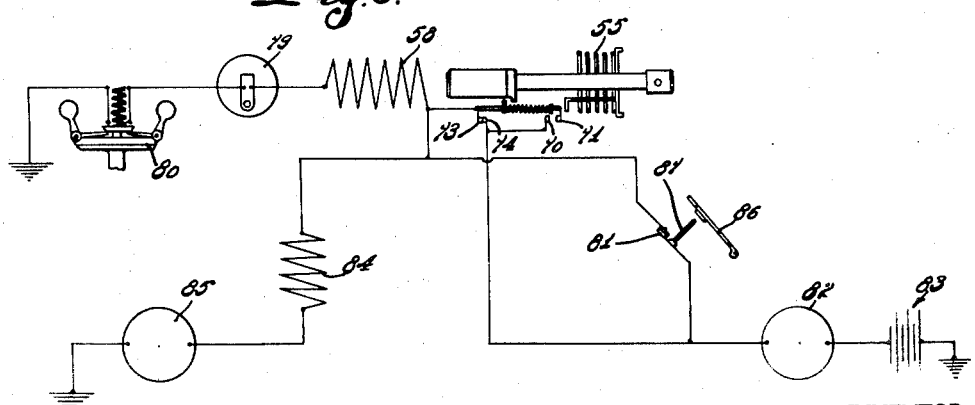
INVENTOR.
William B. Barnes,
BY
Hood & Hahn
ATTORNEYS.

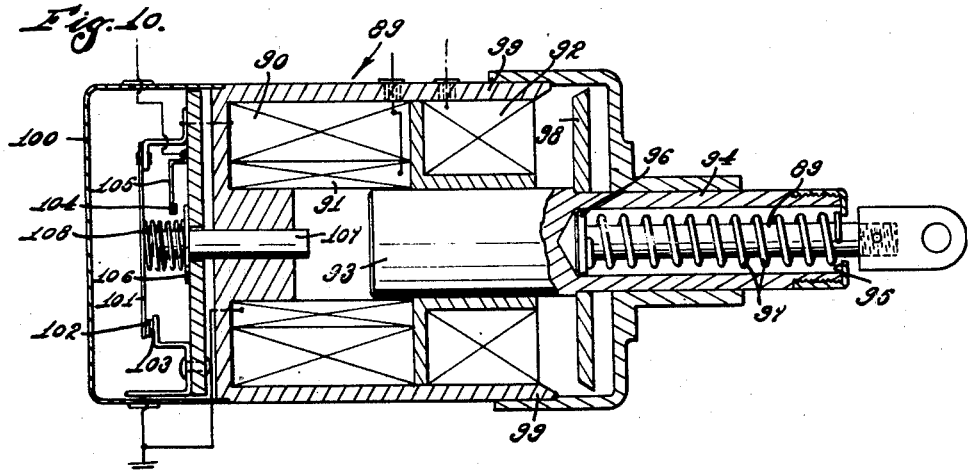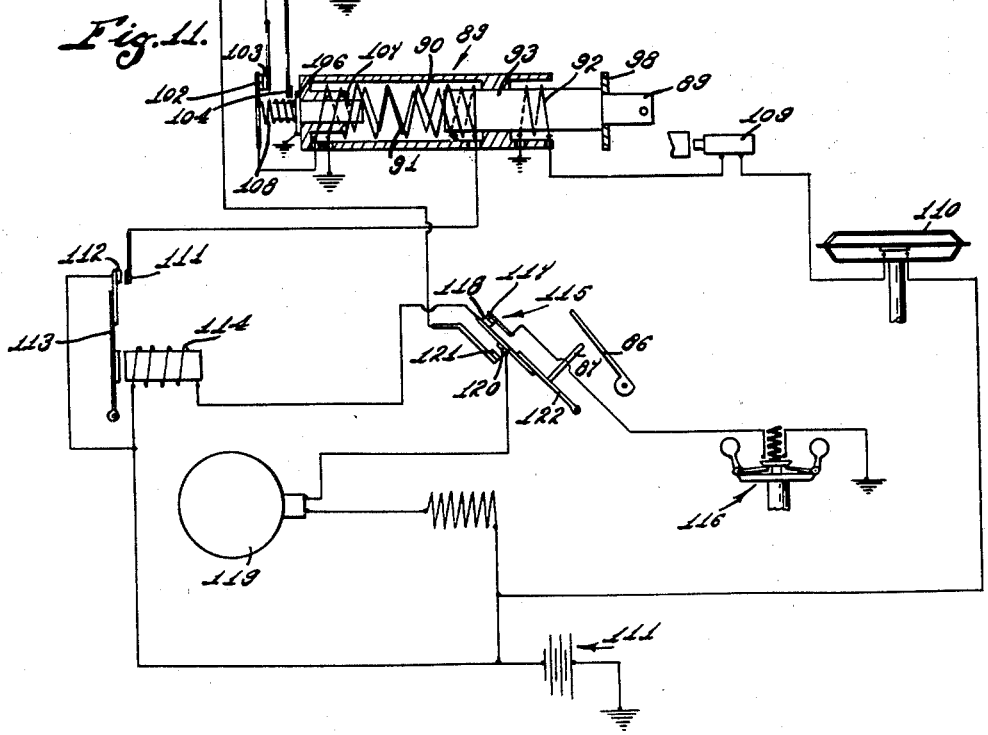

May 17, 1960
W. B. BARNES
2,936,648
TRANSMISSION AND CONTROL THEREFOR
Filed July 22, 1940
9 Sheets-Sheet 6
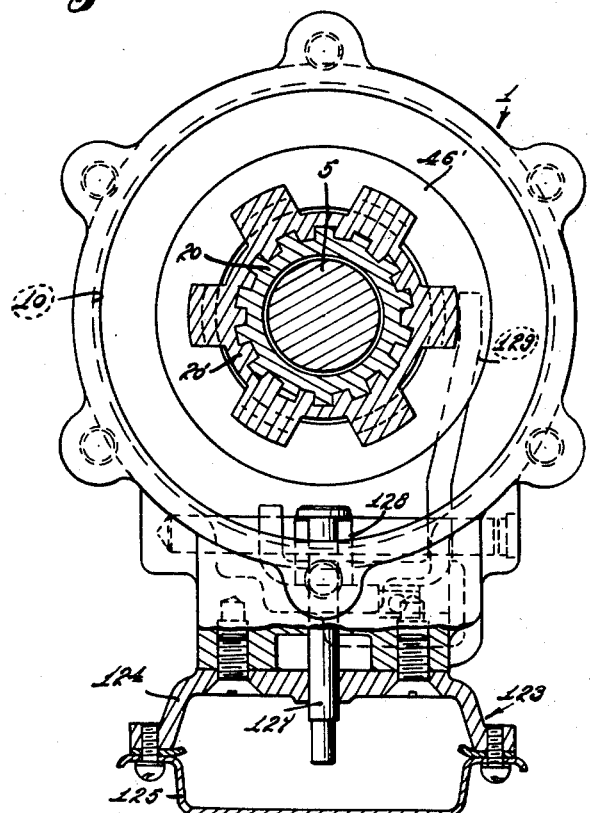
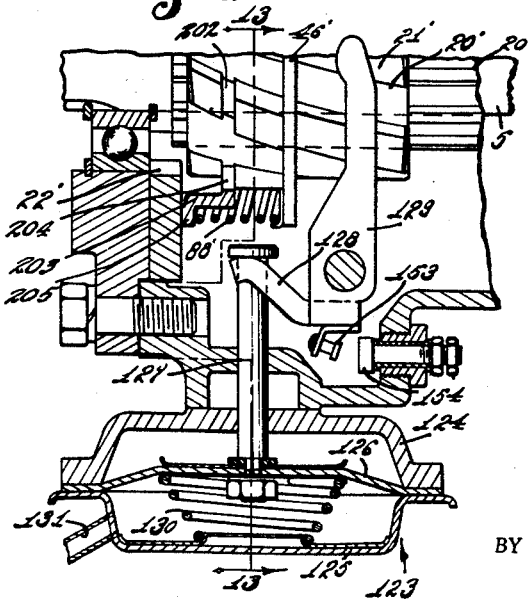
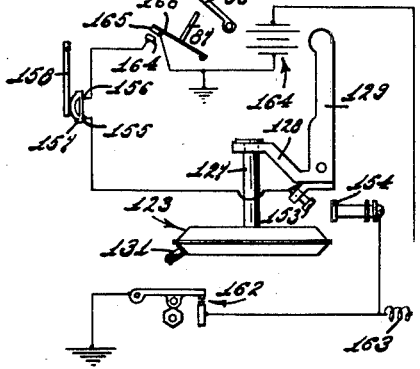
INVENTOR.
William B. Barnes,
Hood + Hahn.
ATTORNEYS.

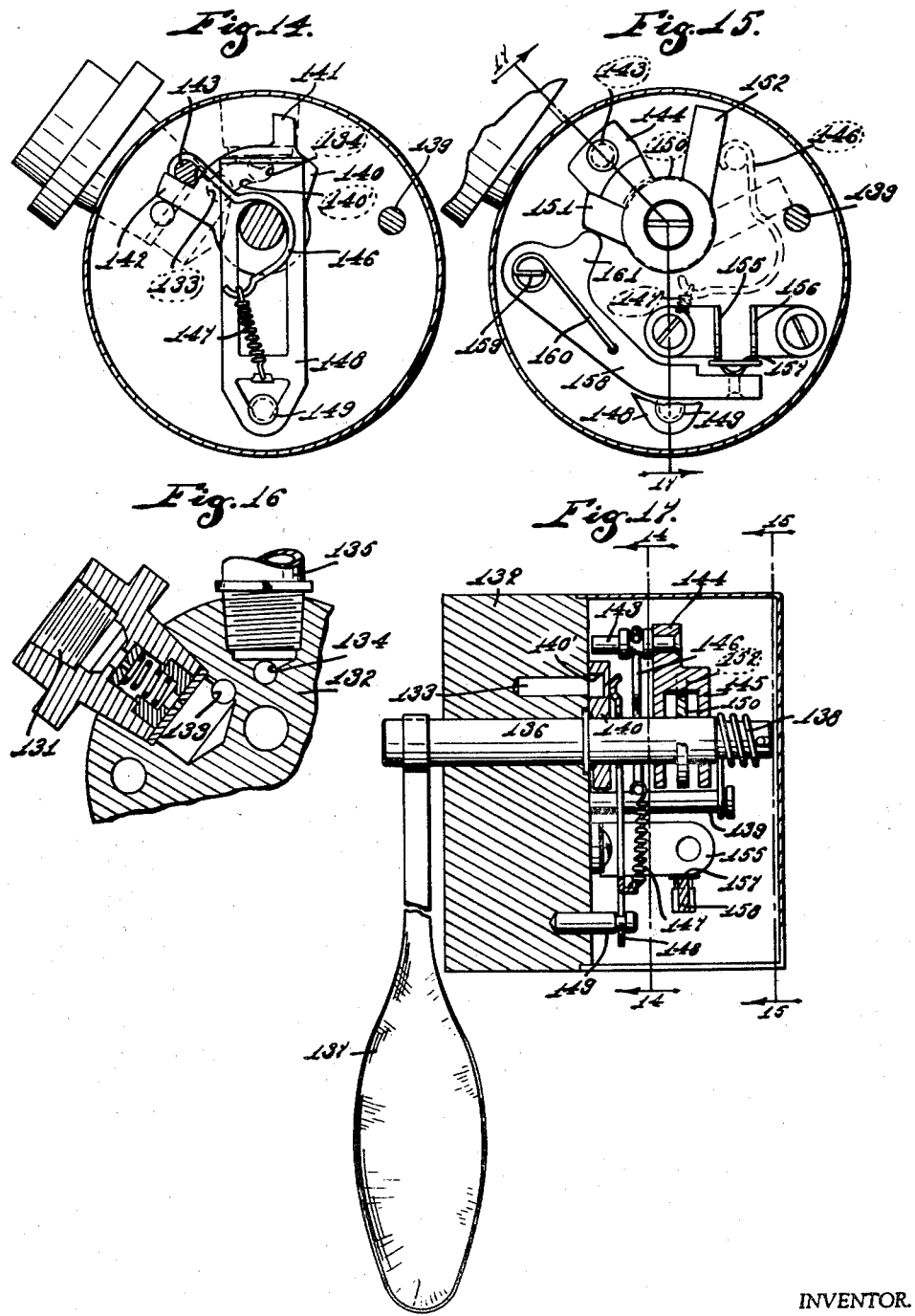

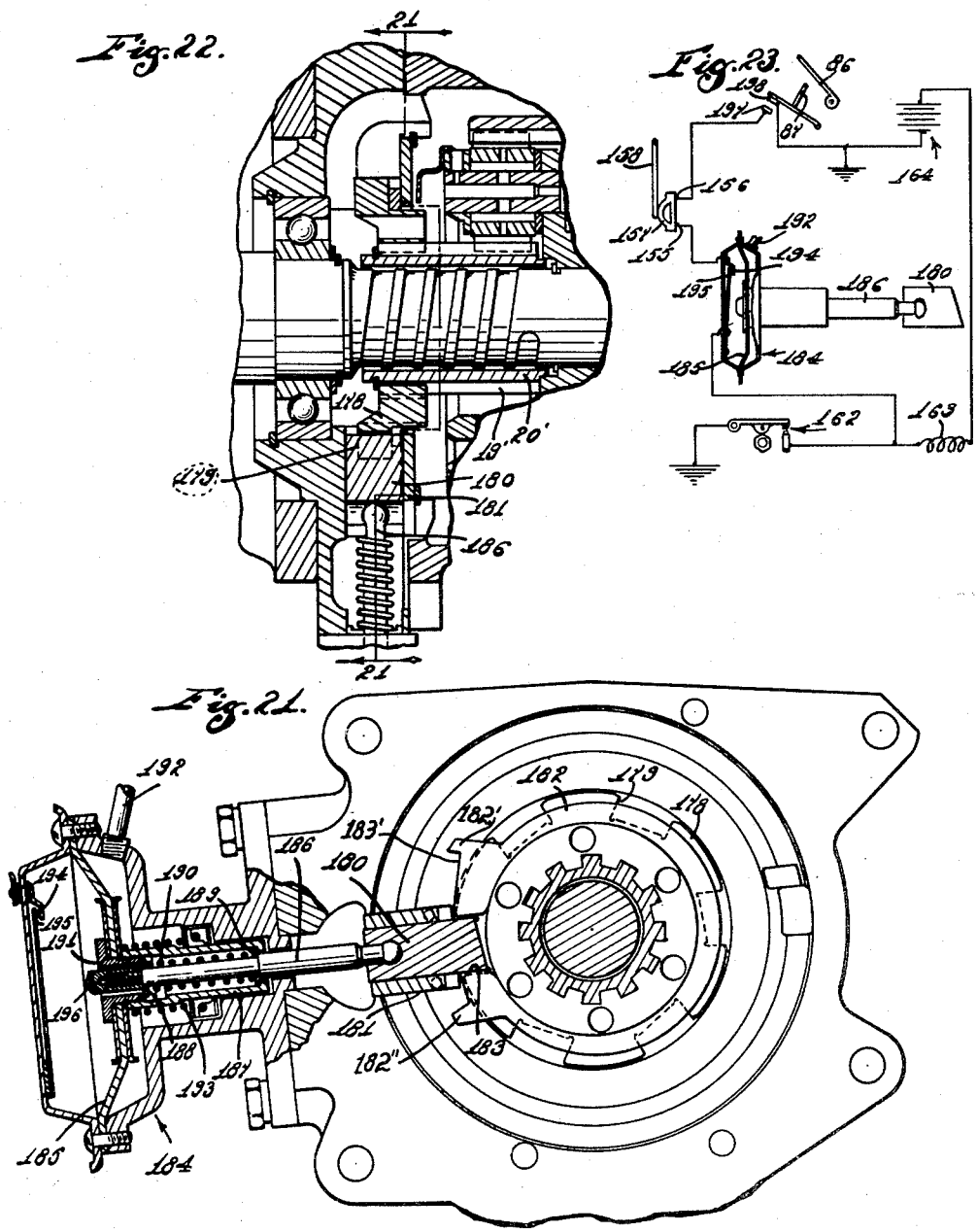

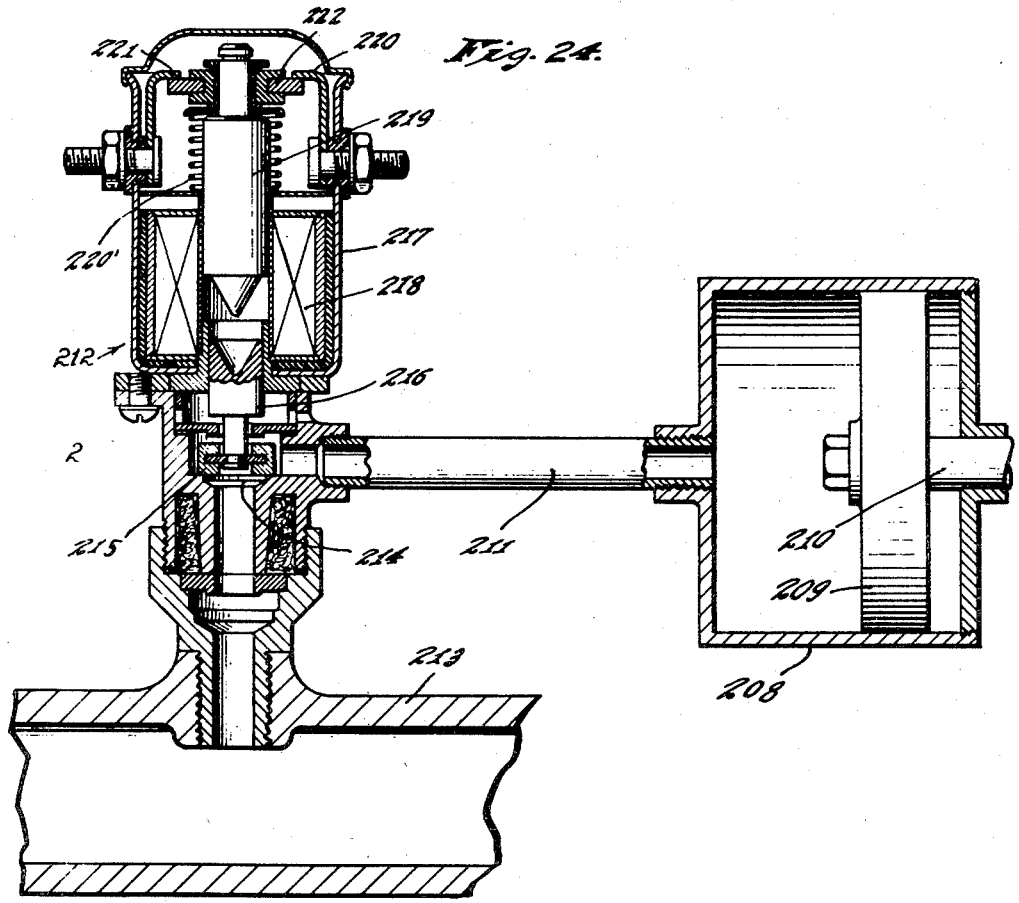
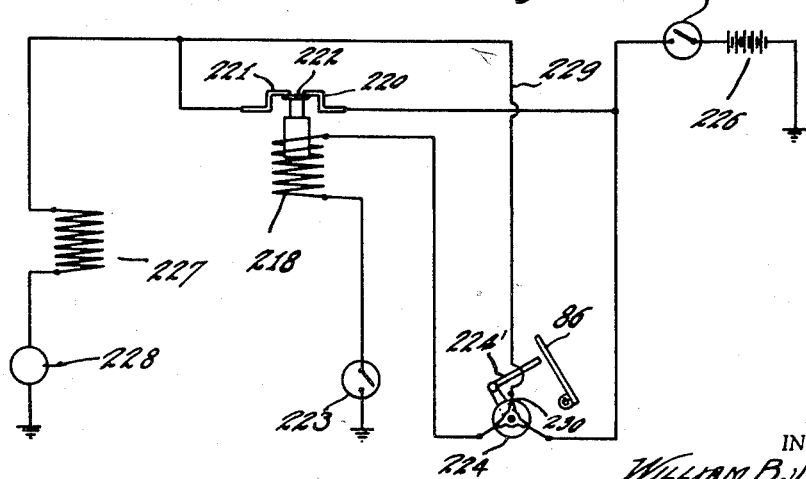

United States Patent Office 2,936,648
Patented May 17, 1960

2,936,648

TRANSMISSION AND CONTROL THEREFOR

William B. Barnes, Muncie, Ind.

Application July 22, 1940, Serial No. 346,861

58 Claims. (Cl. 74—472)

The present invention relates to improvements in transmission gearing adapted to drive one shaft from another at different relative speeds.

The transmission disclosed is adapted particularly for the operation of vehicle shafts from a power or engine driven shaft and is particularly adapted for driving vehicles operated by present-day gasoline or hydrocarbon engine.

One of the objects of the invention is to provide means whereby the transmission mechanism may be automatically shifted to drive the vehicle through the transmission mechanism when the speed of the vehicle and/or the driving or driven shaft reaches a predetermined point, without conscious effort on the part of the driver other than the usual operation of the accelerator pedal of the vehicle for controlling the supply of fuel to the engine. In addition thereto, my invention contemplates means whereby the operator of the vehicle may cause a shift of the transmission mechanism while the vehicle and/or the driving or driven shaft is traveling at or above the predetermined speed, back to another drive.

More specifically, my invention relates to a transmission mechanism of the planetary gear type, through the medium of which the driven shaft for the vehicle may be driven at a higher speed, the transmission mechanism being rendered operative for effecting this higher speed when the speed of the vehicle reaches a predetermined point. Ordinarily, in drives of this and like character, when the transmission mechanism has been shifted to establish a higher speed drive through the instrumentality of a speed control or speed operated mechanism, said higher speed drive, up to a certain point, does not deliver as great a driving torque to the driven shaft of the vehicle as would be the case if the drive were established with the higher speed transmission mechanism inoperative. Ordinarily, in driving with the higher speed established in structures of this general character, it is necessary in order to reestablish the lower speed drive, to permit the vehicle drive to drop down to or below the present determined speed at which the higher speed is established. It is sometimes desirable to increase the torque drive through the lower speed drive without the necessity of dropping the speed of the vehicle. It is one of the objects of my invention to provide means whereby the operator of the vehicle by simple manipulation of a control element as, for instance, the accelerator throttle control member, may increase the torque without the necessity of dropping to a lower speed.

For the purpose of disclosing my invention, I have illustrated various embodiments thereof in the accompanying drawings, in which:

Fig. 1 is a horizontal section through a transmission embodying my invention;

Fig. 2 is a side elevation of the transmission illustrated in Fig. 1;

Fig. 3 is a detail elevation of a reverse shift mechanism;

Fig. 5 is an enlarged detail view of the power unit for effecting a shift of the mechanism;

Fig. 6 is a sectional view on the line 6—6 of Fig. 5;

Fig. 7 is a sectional view of the switching mechanism embodied in the structure disclosed in Fig. 6;

Fig. 8 is a detail sectional view of additional switching mechanism embodied in the structure shown in Fig. 6;

Fig. 9 is a diagrammatic view of the circuit arrangement of the electrical parts of the structure illustrated in Fig. 5;

Fig. 10 is a longitudinal sectional view of a modified form of power unit for effecting a shifting of the mechanism illustrated in Fig. 1;

Fig. 11 is a diagrammatic view of the circuit arrangement of the electrical parts of the structure illustrated in Fig. 11;

Fig. 12 is a detail sectional view of a different form of power mechanism for operating the structure illustrated in Fig. 1;

Fig. 13 is a fragmentary detail section approximately on the line 13—13 of Fig. 13;

Figs. 14 to 17 are detail views of the speed-responsive device for controlling the operation of the structure illustrated in Figs. 12 and 13;

Fig. 18 is a diagrammatic view of a circuit arrangement operating in connection with the structure illustrated in Figs. 12 and 13;

Fig. 20 is a diagrammatic view of a power unit including the driving engine and my improved transmission;

Fig. 21 is a detail transverse section of a further modification of the invention on the line 21—21 of Fig. 22;

Fig. 22 is a detail longitudinal section of a further modification of the invention;

Fig. 23 is a diagrammatic view of the electric circuit for the structure illustrated in Figs. 21 and 22;

Fig. 24 is a longitudinal sectional view of a further modification of my invention; and Fig. 25 is a schematic drawing of the electric circuit used in connection with the structure shown in Fig. 24.

Figure 4:
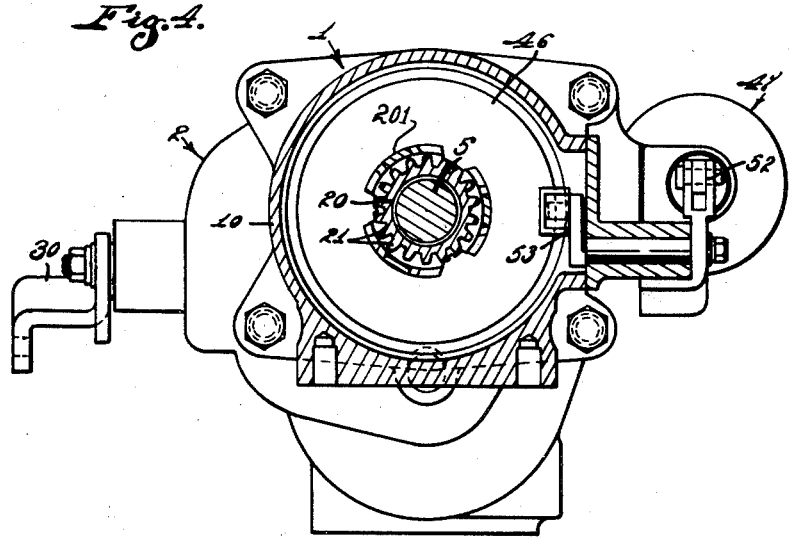
Fig. 4 is a transverse section taken on the line 4—4 of Fig. 1.

In the structure illustrated in Figs. 1 to 4, inclusive, I have shown an overdrive transmission of a planetary gear type 1 as operating in conjunction with a standard three-speed forward and reverse transmission 2 such as is commonly used in the operation of the present day commercial type of automobile. In this structure, the transmission 2 embodies the usual power shaft 3 adapted to be connected through suitable shifting clutch mechanism 4 directly with the shaft 5 which, in effect, becomes the driving shaft of the overdrive mechanism 1. The power shaft 3 is also provided with a driving gear 6 adapted to mesh with suitable gears on a jack shaft (not shown) in turn meshing with a gear 7 rotatably mounted on the shaft 5 and adapted to be connected thereto through the instrumentality of the clutching mechanism 4 for establishing second speed drive. The shaft 5 has splined thereon an axially shiftable gear 8 adapted to be shifted into engagement with a gear on the jack or counter shaft for establishing low speed drive, and with an idler gear in turn driven from the counter shaft for establishing reverse drive of the shaft 5. These parts are all enclosed within a suitable housing in which the shafts 3 and 5 are properly journalled. The shaft 5 is extended rearwardly into the casing or housing 10 of the overdrive transmission or gearing, which casing or housing also receives the driven shaft 11. This driven shaft is provided at its rear end with suitable instrumentalities for connecting the same to the propeller shaft of the vehicle. Suitable bearings are provided for the two shafts within the housing 10. Enclosed within this housing 10 is a supplementary transmission or gearing, in the structure illustrated, for stepping up the speed of the shaft 11, for the purpose of establishing an overdrive of the shaft 11. To this end, the shaft 11 is provided with an overhanging member 12, keyed or otherwise secured to the shaft 11. The inner surface of this overhanging member 12 forms one member 13 of an overruning clutch. Another member 14 of the overruning clutch, preferably having a series of cams formed thereon, is keyed or otherwise secured to the driving shaft 5 and interposed between these two members are roller clutch members 15. Carried by the overhanging member 12 and rotatably secured thereon is a ring gear 16 of a planetary gearing. This ring gear is adapted to mesh with pinion gears 17 carried by a cage 18 driven with the member 14 from the drive shaft 5 and these pinion gears are likewise adapted to mesh with sun gear teeth 19 carried on a sun gear sleeve 20. This sleeve is axially shiftable on the shaft 5. The sun gear sleeve is provided with teeth 21 which, under conditions for establishing a drive through the overdrive gearing are adapted to engage with teeth 22 of a disc 23 secured to one wall of the casing of the transmission. With the teeth 21 in engagement with the teeth 22, the sun gear is locked against rotation and therefore with the shaft 5 driving the pinion cage 18, the shaft 11 will be driven at an increased speed.

If it is desired to lock up the overdrive gearing to establish a direct two-way drive between the shafts 5 and 11, the sleeve 20 is moved to the right until the teeth 21 are in engagement with the teeth 24 on the pinion cage while the sun gear remains in mesh with the pinion gears 17. With the pinion gears 17 and the pinion cage 18 locked together, the entire overdrive is locked up and a direct two-way drive is established between the shafts 5 and 11.

For shifting the clutch member 4, I provide a crank 25 having a shifting arm 25' operating in a groove 26 in the clutch mechanism 4 and this crank is in turn operated by a lever 27 having suitable connections with the operator shifting mechanism.

The gear 8 is shifted for establishing low and reverse gear drive by the means of a shifting fork 28 carried by a crank 29 in turn operated by a shifting lever 30. This lever is connected by suitable connection with driver-manipulated shifting mechanism and the arrangement is such that when this lever 30 is moved to the left, looking at Fig. 2, the gear 8 will be shifted into engagement with the idler gear to establish reverse speed drive. The lever 30 is, in effect a bell crank lever and the opposite arm 31 of this lever is connected by a link 32 with a lever 33. The link 32 has an elongated slot 34 therein receiving a pin 35 on the lever 33. For biasing the lever 33 in its normal position, I provide a coiled spring 36 surrounding a rod 37 secured at one end to a bell crank lever 38 and having its other end projecting through a stop 39 on the lever arm 33. The spring 36 is interposed between this stop 39 and a collar 40 on the rod 37 so that as the link 32 tends to rock the lever 33 to the left, looking at Fig. 2, the spring 36 will be placed under compression to thereby bias the lever 33 to the right when the lever 30 is moved back to neutral position. Due to the slot 34 in the link 32, the lever 30 can be moved to the right, looking at Fig. 2, for establishing a low speed drive without in any way affecting the position of the lever 33. This arrangement is such that when the transmission mechanism 2 is shifted to establish reverse speed drive, the planetary transmission will be locked up for a two-way drive and to accomplish this, the lever 33 operates a shaft 41 extending beneath the casing of the overdrive transmission. This shaft carries, at its opposite end, an arm 42 adapted to release a pivoted arm 43 connected by a link 44 with a shift rod 45 in turn connected to the shifting fork or disc 46. This permits the spring 88 to shift the sun gear sleeve a sufficient distance to the right, looking at Fig. 1, to engage the righthand ends of the teeth 21 with the teeth 24. With the teeth 21 in engagement with teeth 24 and the sun gear 19 still in engagement with the pinion gears 17, the transmission is locked up to establish a direct two-way drive between shafts 5 and 11; therefore, with the transmission 2 shifted into reverse drive, the vehicle can be driven backwards. As soon, however, as the transmission 2 is shifted again into neutral, the coil spring 36, acting on the stop 39 will cause the sleeve 20 to shift to the left, looking at Fig. 1, back to neutral position.

For controlling the movement of the sun gear sleeve 20 to establish a different drive through the planetary gearing or for establishing a direct drive between the shafts 5 and 11, I provide a motor device 47. This motor device 47, in the structure illustrated in Fig. 1, is preferably operated by the subatmospheric pressure developed in the intake manifold of the engine, the subatmospheric pressure shifting the mechanism for locking up the sun gear and maintaining the apparatus in locked up condition, while the apparatus is shifted into non-overdrive position through the medium of a coiled spring 88. In this shifting motor, I provide a cylinder 48 having operating therein a piston 49 which, in turn, operates a piston rod 50 connected by a link 51 with a crank 52. This crank has a shift fork 53 on its inner end adapted to engage the disc 46 and this disc is locked to the sun gear sleeve between a pair of split rings 54 secured in grooves in the teeth 21. The piston 49 is biased in a projected position, that is, in a position to release the sun gear sleeve 20 by a coiled spring 55 arranged within the cylinder 48 and interposed between the top of the piston 49 and separator discs 56 which abuts against a supplemental cylinder 57. A solenoid winding 58 is arranged in the cylinder 48 adjacent the discs 56 and this solenoid is provided with two cores, one 59, which is threaded as at 60 to the end of the piston rod 50 and another 61, which fits loosely within the core 59.

The cylinder 48, at its end (to the left, Fig. 5), is adapted to be connected with the intake manifold of the driving engine of the vehicle and in order that the subatmospheric pressure may operate upon the piston 49, the discs 56 are provided with a port 62 and the cylinder 57, with a port 63, the port 63 communicating with a passage 64 within a valve casing 65 on the end of the cylinder 48. This casing is provided with a connection 66 which extends to the intake manifold. Within this casing, I provide a valve 67 secured to the end (to the left, Fig. 5) of the solenoid core 61 and adapted to control the passage of subatmospheric pressure from the conduit 66 to the cylinder. Under normal operation, with the magnetic winding 58 deenergized, subatmospheric pressure operating on the valve 67 will hold the same closed, thereby preventing passage of subatmospheric pressure to the cylinder 48 and the coiled spring 55 will bias the piston 49 toward the opposite end of the cylinder 48, thereby permitting movement of the sun gear sleeve 20 into a position to disengage teeth 21 from teeth 22 and the overdrive gearing will thus be inoperative.

For venting the cylinder 48, I provide a vent opening 67", which vents into the port 67''' communicating with the annular channel $67^{IV}$, opening to the atmosphere. Suitable screening material is placed in the channel to prevent the ingress of dirt. As shown more fully in the enlarged view, Fig. 5, due to the loose fit between the stem carrying the valve 67 and surrounding casing, when the valve 67 is held closed, shutting off subatmospheric pressure, the casing 48 will be vented to the atmosphere through the ports 62, 63, and 64, thence past the stem of the valve and thence through the port 67" and through the channel $67^{IV}$, to the atmosphere. Therefore, when the valve 67 is in position to seal the inlet 66, being held in that position under subatmospheric pressure, the chamber of casing 48 is placed in communication with the atmosphere. However, when the valve is pulled to the right to open the conduit 66, this valve seats in such a manner as to close the loose fit between the valve stem and its casing, so that communication to the atmosphere is sealed off.

As soon, however, as the electromagnet is energized through suitable control mechanism to be more fully hereinafter described, the core 61 will be drawn inwardly (to the right, Fig. 1) opening the valve 67 and admitting subatmospheric pressure to the cylinder 48 to the left of the piston 49. Even though the solenoid 58 is energized, this solenoid is not sufficiently strong to, in itself, move the piston rod 50, but as soon as subatmospheric pressure is created on the piston 49, this piston will move inwardly within the cylinder, thus operating the shift mechanism to engage the teeth 21 and 22 thus locking the sun gear against rotation and establishing the overspeed drive. With the inward movement of the piston 50, the core member 59 is moved inwardly until it contacts the iron core member 67' of the solenoid, thereby closing the air gap which ordinarily occurs at this point and thus establishing a stronger magnetic flux through the solenoid core 59 which enables the solenoid to hold the core 59 and piston rod 50 in its overdrive position even though the subatmospheric pressure in the cylinder 48 becomes reduced.

Within the cylinder 48 and to one side of the solenoid winding 58, I provide an insulating supporting disc 69. Mounted on this disc 69 is a stationary contact 70 and a movable contact 71 carried by a spring arm 72 which is biased to maintain the contacts in an open position. A second stationary contact 73 is carried on and separated from the insulating disc 69 and this stationary contact 73 is adapted to be engaged by a movable contact 74 carried on a spring arm 75 biasing the contacts in closed direction, the closing direction of the contacts, however, being reverse to that of the contacts 70 and 71. The spring arm 75 is provided with a projection 76 engaged by a suitable insulating disc 77 carried on the plunger rod 50 in such a manner that as the plunger rod 50 moves to engaging position, the contacts 73 and 74 will be opened. On the other hand, the spring arm 72 is adapted to be engaged by a striker insulating disc 78 carried on the piston 49 and in such a position that when the piston 49 is moved into engaging position under the influence of subatmospheric pressure, the contacts 70 and 71 will be closed. However, when the piston 49 moves in the opposite direction, the tension of the spring arm 72 will bias the contacts into open position.

A diagrammatic view of the circuit arrangement of the electrical control of the structure illustrated in Figs. 1, 2, 3 and 4 is illustrated in Fig. 9. Referring to this figure, the solenoid winding 58 has one terminal connected with a switch 79 operated from the transmission shift mechanism and open except when the shift mechanism is in third speed position but adapted to be closed when the shift mechanism is shifted into third speed position. In addition to the switch 79, the winding 58 is also connected through a switch 80 which may be of the governor type and controlled or driven from either drive or driven shaft or adapted to be closed by any other suitable speed control means responsive to either the speed of the shafts or the speed of the vehicle. This switch 80 normally is open while the speed of the shafts driving the same or the speed of the vehicle is operating below a predetermined point. However, when the above-mentioned speed reaches that point where it is desirable to establish the overdrive, the switch 80 is adapted to be closed. The opposite terminal of the solenoid 58 is connected through a switch 81 and through the ignition switch 82 of the engine to one terminal of a source of power such as the battery 83 of the motor vehicle. This switch 81 also controls the circuit through the ignition coil 84 and the distributor 85 of the ignition circuit of the engine. The stationary contact 70 is connected to one terminal of the battery 83 as is the stationary contact 74 while the movable contacts 71 and 73 are connected to the ignition coil 84 and to the winding 58.

The switch 81 is adapted to be controlled by the accelerator pedal 86 controlling the admission of fuel to the engine. The arrangement of this switch 81 with its striker arm 87 is such that the switch 81 under normal operation of the accelerator pedal 86 will not be affected. However, this accelerator pedal 86 has an overtravel beyond full open throttle position and when the throttle pedal 86 has been moved into the overtravel zone, it will engage the striker 87 thus opening the switch 81. The operation of the parts thus far described is as follows:

With the parts in the position illustrated in Figs. 1 and 9, as soon as the speed of the vehicle reaches the predetermined point, at which it is desired to establish the overdrive connection, the switch 80 is closed. This establishes a circuit from the battery 83 through the ignition switch 82, which, of necessity, must be closed with the engine running, through the switch 81, the solenoid winding 58 and back to the opposite side of the battery by a ground connection. With the solenoid winding 58 energized, the valve 67 will be moved to open position, thereby admitting subatmospheric pressure behind the piston 49 so that the piston will be moved in the cylinder toward engaging position (to the left, Fig. 1). The piston striking the enlarged end of the solenoid core 59 will move the piston rod 50 to the left, looking at Fig. 5 and Fig. 1, thereby moving the shift disc 46 (see Fig. 1) to the left, against the pressure of the spring 88 and engaging the teeth 21 with the teeth 22, thereby locking the sun gear of the planetary gear transmission against rotation. With the sun gear of the planetary gear transmission locked against rotation, the overdrive gear becomes effective to establish a drive from the shaft 5 to the shaft 11 through the overdrive gearing so that the shaft 11 will be turning at a higher speed than that of the shaft 5. The vehicle will continue to operate under the control of the accelerator pedal at the increased propeller shaft speed until the driver, removing his foot from the accelerator, permits the speed of the vehicle to drop below the predetermined point, at which time the switch 80 will be opened, thus opening the circuit through the solenoid 58 releasing the valve 67 and permitting the same to move to closed position, thus shutting off subatmospheric pressure to the piston 49 which, under the influence of the spring 55 will move to the right, looking at Fig. 5, releasing the rod 50 which, under the influence of the spring 88 will shift the teeth 21 out of engagement with the teeth 22, thus unlocking the sun gear, permitting the same to rotate freely and establish a direct drive through the overrunning clutch 15.

In view of the fact that with the vehicle drive established through the overdrive gearing, the torque delivery to the propeller shaft is not as great as under certain speed conditions when a direct drive is established between the shafts 5 and 11, there may be periods during the operation of the vehicle with the overdrive established wherein it would be desirable, or even necessary sometimes, to obtain the advantage of the increased torque through a direct drive without the necessity of dropping down in speed until the governor 80 operates to deenergize the winding 58. In order to effect this direct drive without losing speed, the operator may, by manipulating the throttle lever 86 in its overtravel position, open the switch 81. Opening this switch 81, of course, opens the circuit of the winding 58, thereby deenergizing coil 58, releasing the plunger 59, which, under the influence of the spring 88 will tend to move to the right, looking at Figs. 1 and 5. However, the teeth 21 and 22 at this time are being subjected to transmission thrust and in view of the fact that they are under load, there is a sufficient resistance to prevent spring 88 from moving the teeth 21 to disengaging position. Bearing in mind that when it is desirable to effect the direct drive without dropping the speed of the vehicle to the normally predetermined point, the engine is operating at a fairly wide open throttle. The subatmospheric pressure operating on the piston 49 is so reduced that under the influence of the spring 55, this piston will have been moved to the right, looking at Fig. 5, and the disc 78 will accordingly be out of the path of the movable contact 71. With the opening of the switch 81, the ignition circuit will be momentarily interrupted, releasing the torque on the teeth 21 and 22. This then permits the core 59 to move to the right, looking at Fig. 1, under the influence of the spring 88 which will close contacts 73 and 74 thus immediately restoring the engine ignition. It is, therefore, apparent that the ignition circuit is only momentarily interrupted and for just sufficient time to relieve the torque on the teeth 21 and 22 to permit the disengagement of these teeth. The arrangement of the floating piston 49 also insures the proper operation of the parts even though the engine is operating under full open throttle conditions and it is desired to go into direct drive. Under these circumstances, with the engine operating under full open throttle conditions, the vacuum or subatmospheric pressure tending to hold the piston 49 to the extreme left is so reduced that under the influence of the spring 55 this piston 49 will shift to the right, permitting the subsequent rapid movement of the core 59 and plunger 50 and insuring the operation of the parts. This condition, of course, will exist as long as the switch 81 is maintained in an open position. When, however, the operator desires to again establish overdrive conditions, the throttle control 86 is moved far enough towards closed position to permit switch 81 to again close, thus closing the circuit through the winding 58 and again establishing the overdrive relationship. The moving of the throttle control 86 towards closed position likewise increases the subatmospheric pressure on the piston 49 to supplement the action of the solenoid 58 in moving the sleeve 20 in a direction to again engage the teeth 21 with the teeth 22.

In Figs. 10 and 11, I have illustrated a modification of the motor which is used for shifting the lock for the sun gear. In the structure illustrated in Figs. 1 to 9, inclusive, this motor is operated by subatmospheric pressure, the admission of the pressure to the motor being controlled by a solenoid. In the structure illustrated in Figs. 10 and 11, the motor is an electromagnetic motor in the form of a solenoid. As illustrated in Fig. 10, the solenoid 89 operates upon the shifting rod 89' taking the place of the piston rod 50 for shifting the sun gear lock-up. This solenoid is provided with three windings; one, 90, a relatively heavy winding exerting rather a strong pulling force; two, a primary holding winding 91 intended for holding purpose; and a secondary holding winding 92. These windings all operate upon a solenoid core 93 having a sleeve extension 94 surrounding the rod 89'. One end of this sleeve extension is provided with a shoulder 95 between which and a collar 96 on the opposite end of the rod is interposed a coiled spring 97. The arrangement is such that, as the solenoid core is attracted by the windings, the spring 97 will be placed under compression, in turn tending to move the rod 89' into braking or holding position (to the left of that shown in Fig. 10). The solenoid core 93 also carries a soft iron armature member 98 which, when the core is in its attracted position, is adapted to bridge the pole pieces 99 of the solenoid to thus close the air gap thereof and increase the holding effort of the solenoid.

Within a casing 100 mounted at the opposite end of the solenoid, I provide a spring arm 101 carrying a contact 102 normally in engagement with a stationary contact 103. A second contact 104 carried by the arm 105 is adapted to be engaged by a grounded collar 106 mounted on plunger 107 biased, in a position to maintain the contacts open, by a coiled spring 108. This plunger 107 is in a position to be struck by the core 93 when the core is moved into its attracted direction and the arrangement is such that, initially, collar 106 will engage contact 104 and subsequently, the plunger 107, engaging the spring arm 101 will open contacts 102 and 103.

The circuit for controlling the operation of the electromagnet shown in Fig. 10 is more clearly illustrated in Fig. 11. In this figure, the secondary holding coil 92 is shown as having one terminal connected through a reverse switch 109 and through a vacuum operated switch 110 to one side of a source of power in the form of a battery 111. The opposite side of this battery is grounded, as is the opposite terminal of the winding 92. This winding 92 is not of sufficient strength in itself to operate the core 93 of the electromagnet. The reverse switch 109 is connected with the shift mechanism in such a way that when the shift mechanism is moved into reverse drive, this switch will be moved to an open position, thereby opening the circuit through the secondary holding coil and thus releasing the core 93 of the electromagnet whereupon teeth 21 may be moved into engagement with teeth 24. As long as the shift mechanism for the transmission is in neutral or in forward drive position, the switch 109 will be closed, so that the circuit through the winding 92 will be closed. The switch 110 is connected to the intake manifold of the engine and is therefore responsive to the vacuum produced in said intake manifold. When the engine is running on normal throttle control with high vacuum produced in the intake manifold, this switch will be closed. However, if the accelerator is suddenly depressed or the engine is running at full open throttle, there will not be sufficient vacuum established in this switch for holding the switch closed thus permitting teeth 21 to engage teeth 24 under synchronous speed conditions.

One terminal of each of the windings 90 and 91 is connected through a relay switch, one contact 111 of which is stationary and the other contact 112 of which is mounted on the armature 113 of a relay magnet including the winding 114. This movable contact 112 is connected with one terminal of the battery. The opposite terminal of the winding 91 is grounded and, therefore, when the circuit is closed through the relay switch, the circuit through the winding 91 is closed. The opposite terminal of the winding 90 is connected with a contact 102 of a switch which is normally in engagement with the grounded contact 103 so that as long as contacts 103 and 102 are closed and the relay switch contacts 111 and 112 are closed, a circuit will also be established through both windings 90 and 91 of the solenoid, assuming switch 116 to be closed.

For controlling the circuit through the winding 114 of the relay switch, I provide two switches, one switch 115 and the other switch 116. The contacts 117 and 118 of switch 115 are normally closed. The movable contact 118 is adapted to be controlled by the accelerator pedal 86 and operating stem 87 in the same manner as the switch is controlled in the circuit illustrated in Fig. 9. That is, the contacts 117 and 118 are normally closed during the normal operation of the accelerator pedal 86. However, when the pedal 86 is moved beyond full open throttle position, the pedal 86 will operate the stem 87, thereby opening the contacts 117 and 118.

The switch 116 is a governor control switch of the same characteristics as switch 80. That is, this switch is responsive to the speed either of the vehicle or one of the shafts 5 or 11. Even through the governor be driven from either of the shifts 5 or 11, it would be responsive to the speed of the vehicle. Likewise, if the switch were operated by a paddle structure, as shown in Fig. 17, and responsive to the wind pressure of the engine fan, it would be responsive to the speed of the vehicle, assuming that the vehicle is being operated normally with the engine driving the vehicle. This switch is so arranged that when the speed of the vehicle or the shafts 5 or 11 reaches a predetermined point, the contacts in this switch are closed and due to the fact that switch 115 is also closed, circuit will be closed through the winding 114. When the winding 114 is energized, the armature 113 will be attracted to close contacts 111 and 112, thereby closing the circuit through the windings 90 and 91 of the solenoid. This energizes both the holding coil 91 and the traction coil 90, thereby sufficiently energizing the solenoid to move the core 93 in its attracted position, thus, in turn, moving the rod 89 to cause an engagement of the teeth 21 and 22, and locking the sun gear against rotation to establish overdrive conditions in the planetary gearing. As the solenoid core 93 moves to its fully attracted position, the shoft iron armature will bridge the gap of the pole pieces 99 of the electromagnet, thus increasing the power of the electromagnet and, at the same time, the core 93 will strike the plunger 107 moving the same to open contacts 102 and 103. This opens the circuit of the traction coil 90 leaving, however, the holding coil 91 still energized. As a result of this arrangement, considerably less drain is placed on the battery 111. During the shift into overdrive, a powerful pulling action is desirable in the solenoid. However, after the sun gear is braked, a lighter pull is sufficient to maintain the parts in the position to which they have been moved and therefore the traction coil may be dispensed with, thus reducing considerably the load imposed on the battery.

As explained in connection with Figs. 1 to 9, there are occasions when it is desirable to establish a direct drive without dropping the speed of the vehicle to the point where the switch 116 will be opened. Therefore, I provide a short circuit switch for the ignition circuit which circuit includes the distributor 119. This switch includes a pair of normally open contacts 120 and 121, the contact 120 being mounted on the arm 122 which likewise carries the switch 118. Therefore, when the arm 122 is moved by the accelerator pedal 86 to open contacts 117 and 118 and thus open the circuit through the winding 114, it closes contacts 120 and 121, which contacts are in series with the contact 104 and the collar 106. It is to be remembered that when overdrive conditions are established, collar 106 moves into engagement with contact 104, therefore, when contacts 120 and 121 are closed, the distributor 119 of the engine ignition circuit will be short-circuited through contacts 120 and 121 and contacts 104 and collar 106, this collar being grounded on the frame. At the same time that contacts 120 and 121 are closed, the circuit through the relay winding 114 is opened, thereby breaking the circuit through the holding coil 91 of the solenoid and thus deenergizing the holding coil and permitting the spring 88 to disengage teeth 21 and teeth 22. This disengaging movement also pulls the core 93 in its retracted position, thereby permitting plunger 107 to move to its retracted position, opening the circuit at contact 104 and collar 106. It is, therefore, apparent that the short circuit for the engine ignition system is only momentary and merely sufficiently long to interrupt the transmission thrust on the teeth 21 and 22 to permit these teeth to disengage.

In Figs. 12 to 18, inclusive, I have illustrated a still further modification of my invention wherein a subatmospheric pressure of the motor is used for braking the sun gear against rotation to establish overdrive condition through the planetary gearing. In this structure, referring particularly to Figs. 12 and 13, the teeth 21' on the sun gear sleeve 20' are adapted to be moved to the left, looking at Fig. 12, into engagement with the teeth 22' fixed against rotation in the casing to hold the sun gear against rotation. This sleeve 20' is provided with a shift disc 46' in the same manner as is illustrated in Fig. 1. The subatmospheric pressure motor 123 comprises a casing of two sections 124 and 125 between which is mounted a diaphragm 126. This diaphragm is connected with a shifting stem 127 in turn operating in the forked arm 128 of a bell crank lever, the opposite arm 129 of which is adapted to be moved into engagement with the disc 46' to shift the disc to the left, looking at Fig. 12. A coiled spring 130 is interposed between the casing section 125 and the diaphragm 126 to bias the diaphragm in disengaging position and the diaphragm is adapted to be moved against the spring 130 through the influence of subatmospheric pressure. To this end, the casing section 125 is connected by a conduit 131 with the intake manifold of the engine, through a suitable speed responsive valve illustrated in Figs. 14 to 17 inclusive, so that when the speed of the engine and correspondingly the speed of the vehicle reaches a predetermined point, this valve will be opened admitting subatmospheric pressure to the motor 123 to operate the same and effect a lockup of the sun gear and thus establish a drive through the overdrive gearing.

In the valve structure illustrated in Figs. 14 to 17, I provide a base 132 having a port 133 therein adapted to communicate with the conduit 131. This base also is provided with a port 134 adapted to be connected by a conduit 135 with the intake manifold of the engine. A shaft 136 is mounted in the base. This shaft carries, at one of its ends, a paddle 137 which, with the valve mounted in a position on the engine block, is in the air stream of the cooling fan of the engine and is therefore subjected to the air pressure delivered by this cooling fan which in turn is responsive to the speed of the vehicle, with the vehicle in normal driving condition and the engine driving the vehicle. A coiled spring 138 surrounding the shaft 136 and having one end connected thereto and the opposite end bearing against a stop pin 139 biases the shaft in a retracted or closed valve position. This spring 138 exerts sufficient tension on the shaft 136 to prevent the rotation thereof until the fan of the engine has reached a predetermined speed to deliver sufficient pressure to overcome the bias of the spring 138. Therefore, this valve will not operate to admit subatmospheric pressure to the motor 123 until the speed of the vehicle has reached a predetermined point.

A valve casing 140 surrounds the shaft 136 bearing on the face of the base 132 and having a valve slot 140' therein adapted to connect the two ports 134 and 133, under predetermined speed conditions. The valve casing 140 is provided with a pair of arms 141 and 142 which are adapted to be struck by a pin 143 carried on an arm 144 extending radially from a hub 145 rotatably mounted on the shaft 136. To impart a snap rotative action in one direction or the other to this hub 145, the pin 143 is connected by a link 146 with a coiled spring 147 anchored to and carried on an arm 148 in turn pivotally mounted on a stationary pin 149 on the base 132. 1 is arm, at one end, bears on the casing 140 and thus the spring 147 not only tends to impart a snap action to the hub 145 but also resiliently holds the valve casing against the face of the base.

A hub 150 is fixed on the shaft 136 and this hub is provided with a pair of striker arms 151 and 152 adapted to, under proper conditions, strike the arm 144 and rotatably move the same. By this arrangement, the valve will be snapped opened and closed only when the shaft 136 has been rotated far enough for the arm 151 or arm 152 to strike the arm 144 and therefore rotate the same until the pin 143 has been moved past dead center, after which the action of the spring 147 will snap the arm around and in turn snap the valve in the position to connect or disconnect the motor 125 and the intake manifold of the engine.

In operation, as the speed of the vehicle reaches a predetermined point, the paddle 137 will be moved under the influence of the wind pressure from the vehicle fan, to operate the valve 140 to connect the motor 123 with the intake manifold of the vehicle. Under these circumstances, subatmospheric pressure admitted to the motor operating on the diaphragm 126 will move the diaphragm to shift the arm 129 and in turn shift the teeth 21' into engagement with the teeth 22' to brake the sun gear. Likewise, when the speed of the vehicle drops below a predetermined point and therefore the wind pressure of the fan drops sufficiently, the shaft 136 will be rotated in the opposite direction operating the valve 140 to disconnect the motor 123 from the intake manifold and opening the conduit 131 to atmosphere. Therefore, the spring 88', being under compression, shifts the teeth 21' out of engagement with the teeth 22' to unlock the sun gear, permitting the sun gear to rotate and thus establish a direct drive from the shafts 5 and 11.

In Fig. 18, I have illustrated diagrammatically a circuit arrangement which may be used in connection with the structure illustrated in Figs. 12 to 17. It will be noted, by reference to Fig. 12, that on the arm 129, I have provided a contact 153 adapted, when the arm is moved to braking position to engage a contact 154.

It will also be noted by reference particularly to Fig. 15, that on the base 132, I provide a pair of contacts 155 and 156 adapted to be bridged by a contact 157. This contact is carried by an arm 158 pivoted at 159 and biased in a position to bridge the contacts 155 and 156 by a spring 160. This arm is provided with a finger 161 adapted to be engaged and moved by the arm 151 to open the switch when the arm 151 is moved past a predetermined position. I have found, from experience, that after certain high speeds have been reached in the driving of the vehicle, it is not desirable to shift from the overdrive to the direct drive or, as is expressed in the commercial art, kick down from overspeed to direct. Therefore, when this critical high speed has been reached, the arm 151 through the influence of the paddle 137 will have been shifted sufficiently far to, by its engagement with the finger 161, open the circuit between contacts 155 and 156.

Referring now to the electric circuit, diagrammatically illustrated in Fig. 18, the circuit breaker 162 of the ignition system of the engine and the primary coil 163 of this ignition system are shown connected to the battery or other source of power 164. The contact 154 is connected in this circuit. The contact 153 is connected through contacts 155 and 156 with a pair of normally open contacts 164 and 165. The contact 165 is mounted on movable arm 166 adapted to be engaged by the accelerator pedal 86 which engages the stem 87 after it has moved beyond full open throttle position. With the sun gear braked, as has heretofore been described in connection with Figs. 12 to 17 inclusive, contacts 153 and 154 will be closed and contacts 155 and 156 will be bridged by contact 157. However, contacts 165 and 164 will be opened. If now, while traveling at a speed wherein the sun gear is braked or locked, it be desired to establish a direct drive between shafts 5 and 11 without again dropping down to the relatively slow speed wherein the sun gear will be disengaged by shutting off the subatmospheric pressure to the diaphragm 126, the operator merely depresses the accelerator pedal 86 beyond full open throttle position to close contacts 164 and 165. Bearing in mind the fact that contacts 153 and 154 and 155 and 156 are closed with the closing of contacts 164 and 165, the circuit breaker 162 will be short-circuited, thus short-circuiting the engine ignition system and causing the engine to miss. With the engine missing and with no vacuum on diaphragm 126 due to wide open throttle condition, the teeth 21' and 22' are relieved of their thrust load and therefore under the influence of the spring 88', the sun gear sleeve 20' will be moved to disengage teeth 21' from the teeth 22' and unlock the sun gear thus establishing a direct drive between shafts 5 and 11. At the same time that this shifting of the sun gear sleeve 20' takes place, contacts 153 and 154 will be opened thereby opening the short circuit and re-establishing the ignition system of the engine.

If the speed of the vehicle has reached that point where the kickdown would be undesirable, then of course contacts 156 and 155 will be opened and, even though contacts 165 and 164 will be closed by the depression of the accelerator pedal 186, there will be no interruption to the engine ignition system and therefore the thrust on teeth 21' and 22' will not be relieved and the sun gear will remain locked up.

Figure 19:
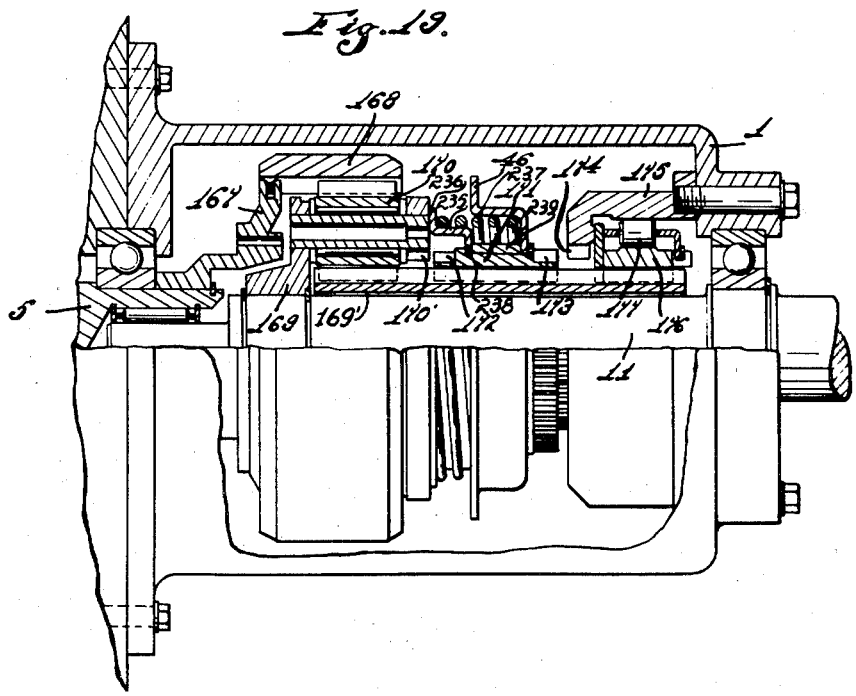
Fig. 19 is a longitudinal sectional view of a modification of a transmission mechanism controllable through my improved control apparatus.

In Fig. 19, I have illustrated a modification of the transmission heretofore illustrated, wherein the planetary gear becomes an underdrive gear and the high speed drive between shafts 5 and 11 is the direct drive. In this structure, I provide a head 167 keyed on the driving shaft 5 and carrying a ring gear 168. A planet gear cage 169 is keyed on the propeller shaft 11. This cage carries the planet pinions 170 meshing with the ring gear 168 and the sun gear teeth on the sun gear sleeve 169'. This cage is also provided with teeth 170' for the purpose more fully hereinafter described. Keyed and axially slidable on the sun gear sleeve 169' is a second sleeve 171 having teeth 172 adapted to engage teeth 170' and also a set of teeth 173 adapted, under certain conditions, to engage teeth 174 formed on an overhang bolted or otherwise secured to the housing of the transmission casing. Also splined on the sun gear sleeve is one member 176 of an overrunning clutch, the other member of which is formed on the inner face of the hub 175, suitable rollers 177 being interposed between these two clutch members. The arrangement of the cam faces on the clutch member 176 is such that any tendency of the sleeve and sun gear to move in a reverse direction will lock the clutch. In the above structure, when the sleeve 171 is shifted to the left, looking at Fig. 19, teeth 170' will be engaged by teeth 172 and the planetary gear structure will be locked up to establish a two-way one-to-one drive between shafts 5 and 11. However, if the sleeve 171 should be shifted to the right, looking at Fig. 19, then the sun gear sleeve will be locked against rotation by the overrunning clutch and a reduced drive through the planetary gear structure will be established between shafts 5 and 11. Likewise, when the teeth 173 engage teeth 174, the sun gear will be locked against rotation, in this instance, however, in either direction. This is the position in which the sleeve will be shifted when the standard transmission is operated to establish reverse drive.

In the modifications illustrated in Figs. 21 to 23, inclusive, I have shown an arrangement whereby, instead of providing an axially movable sleeve for locking the sun gear against rotation, there is provided a radially movable dog which is moved into engaging position by a power motor, specifically illustrated in these figures as being a fluid pressure motor operating under subatmospheric pressure.

Referring to the structure illustrated, the sun gear sleeve 20' is provided with the sun gear teeth 19' adapted to be engaged by the planet pinions as is the arrangement in the structures heretofore described. This sleeve 20' is provided with a disc 178 which is splined on the sleeve 20' being provided with splined recesses adapted to receive splines which, in effect, are continuations of the sun gear teeth 19'. This disc, therefore, is rotatably locked to the sleeve 20'. The outer periphery of this disc is provided with a series of peripheral recesses 179, any one of which will receive a radially movable dog or pawl 180 operating in a slot in a ring 181 bolted or otherwise secured to the casing, so that, while the dog is radially movable, it is rotatably stationary. A blocker ring 182 surrounds the hub of the disc 178 and this blocker ring is provided with spaced apart ends to provide an opening 183, the arrangement being such that when the pawl 180 is disengaged from the recesses 179, the blocker ring will slide beneath this pawl to prevent re-engagement of the same until the tendency of the disc to rotate in the opsite direction moves the opening 183 again beneath the pawl. The blocker ring 182, due to its frictional engagement with the hub of the disk 178, will tend to rotate with this hub, which hub rotates with the sleeve 20' carrying the sun gear teeth 19'. The blocker ring 182 is provided with radially projecting stop fingers 182' and 182" adapted to engage the locking element or pawl 180 when the latter is in its retracted position, so as to establish limits between which the blocker ring may oscillate. Between the fingers 182' and the space or opening 183, the blocker ring is provided with a shoulder 183' against which the inner end of the pawl or stop member 180 may engage. As the result of the driving engagement between the ring 182 and the hub 178, the ring 182 is adapted, when the sun gear 20' is rotating in a counter clockwise direction, as viewed in Fig. 21, to be positioned in such a manner that the locking member or pawl 180 will be arrested in its projected or engaging movement by the shoulder 183'. Such counter clockwise rotation of the sun gear will result from the sun gear and planet gear units of the planetary mechanism rotating together synchronously when a one to one drive ratio is effected between the drive and driven shafts.

Deceleration of the driving shaft will cause the sun gear to reverse its direction of rotation, whereupon the blocker ring 182 will be moved in a clockwise direction until the locking element or pawl 180 enters the space 183 and engages in one of the peripheral recesses 179 of the disc 178.

The deceleration of the driving shaft is accomplished by easing up on the throttle control member 86 to thereby decelerate the drive shaft 3, so as to cause the cage 18 to lag behind the ring gear 16 and the sun gear 19' to correspondingly lag behind the cage 18 until the sun gear 19' ceases rotating forwardly and commences to rotate in the reverse. The blocker ring 182, which tends to rotate with the sun gear by reason of its frictional driving association therewith, will thereupon oscillate in a position, allowing the locking element or pawl 180 to be projected into one of the recesses 179. This arrangement prevents chattering of the pawl under certain operating conditions. For operating the pawl and moving the same into engaged position, I provide a fluid pressure motor 184 provided with a flexible diaphragm 185. This diaphragm 185 controls the operation of a rod or plunger 186 connected to the pawl 180. To this end, the diaphragm is provided with a hollow sleeve 187 surrounding the plunger 186. The plunger 186 near its outer end is provided with a fixed collar 188 and between this fixed collar and a loose collar 189 on the plunger is arranged a helical compression spring 190. The diaphragm 185 is provided with a sleeve 191 which is adapted, as the diaphragm is moved inwardly, to engage the collar 188 and thereby force the dog or pawl 180 into an engaging position. When the diaphragm is moved outwardly, it is free to move relatively to the plunger 186. However, such outward movement of the diaphragm places the spring 190 under compression, thereby biasing the pawl 180 toward disengaging position; and as soon as the resistance against disengaging movement of the pawl is relieved in the manner hereinafter set forth, the compressed spring will move the pawl into disengaged position.

It is apparent, therefore, that as the accelerator 186 reaches full open throttle position and before it engages the sleeve 187, subatmospheric pressure will be so reduced that the spring 193 will operate to move the sleeve 187 to compress the spring 190. This takes up the slack between the collar 189 which is engaged by the inturned flange on the sleeve 187 and the plunger 196, so that upon a continued movement of the accelerator pedal 186 to thereby close the short circuit for the ignition system, thereby cutting out the ignition, the pawl 180 will be moved to disengaged position. When the pawl 180 moves to disengaged position, the plunger 196 fastened to and forming a part of the plunger 186 will engage the arm of the switch contact 195, thereby opening the short circuit of the ignition system and restoring the ignition system.

The subatmospheric motor 184 is connected by a suitable conduit 192 through the speed control valve illustrated in Figs. 14 to 17, inclusive, with the intake manifold of the driving engine for the vehicle.

Within the motor 184, I provide a stationary contact 194 and a movable contact 195. The spring finger of the contact 195 biases the contacts into closed position. When, however, subatmospheric pressure is cut off from the diaphragm 185 and this diaphragm moves into retracted position, a plunger 196 will open or separate the contacts 194 and 195.

In Fig. 23, I have illustrated, diagrammatically, the electric circuit operating in connection with the structure illustrated in Figs. 21 and 22. In this figure, it will be seen that the movable contact 195 is connected to one side of the circuit, including the ignition system of the engine. The stationary contact 194 is connected through contacts 155, 157 and 156 to a contact 197. This contact is adapted to be engaged by a movable contact 198 in turn operated by the accelerator control pedal 86, in the same manner as has heretofore been described.

In operation, when the speed of the speed control valve illustrated in Figs. 15 to 17, inclusive, has reached the predetermined point where the valve is opened to admit subatmospheric pressure to the motor 184, this subatmospheric pressure will operate on the diaphragm 185 to move the dog or pawl 180 into engagement with one of the recesses 179, thereby locking the sun gear against rotation and establishing the overdrive through the planetary gearing. Under normal conditions, the overdrive remains established as long as the engine is operating above the predetermined speed. As soon, however, as the engine or vehicle drops below this predetermined speed, the speed control governor valve will be operated to shut off subatmospheric pressure to the diaphragm 185 and the diaphragm will operate to permit the disengagement of the dog 180. If, during the operation of the engine or vehicle above the predetermined speed, it be desired to release the sun gear, thereby establishing direct drive between the shafts 5 and 11, as heretofore described, the operator, by moving the accelerator pedal 86 beyond full open throttle position, so reduces the subatmospheric pressure on the diaphragm 185, that the spring 193 will tend to move this diaphragm in a position to compress spring 190. At the same time, the movement of the accelerator pedal 86 closes contacts 197 and 198 and contacts 194 and 195 being closed, the ignition system of the engine is immediately short-circuited. This causes the engine to miss, relieving the driving torque on the driving shaft, thus releasing the dog 180 so that the compressed spring 190 can pull the dog out of engagement with its recess 179 thereby releasing the sun gear. At the same time, the plunger 196 strikes the arm of the switch contact 195 kicking the contacts 194 and 195 open, thereby opening the short circuit and restoring the engine ignition circuit to its usual condition. Under these circumstances, the drive will be a direct drive instead of through the planetary gearing. In order to restore the overdrive conditions, the operator, by easing up on the accelerator pedal 86 increases the vacuum developed in the intake manifold, thus increasing the subatmospheric pressure on the diaphragm 185 which again moves the pawl into one of the recesses 179 locking the sun gear against rotation and establishing the overdrive.

It is obvious that the pawl 180 instead of being operated by the subatmospheric pressure motor 184, as illustrated, could be operated by the electromagnet illustrated in Fig. 10. All that would be necessary to accomplish this would be to provide a suitable operating connection between the rod 89' and the pawl, whereby the movement of the core 93 would move the pawl into an engaged position.

In each of the structures illustrated heretofore, I have provided means for preventing clashing of the interengaging parts for braking the sun gear. Referring first to the structure illustrated in Fig. 1, it is to be noted that there is a sleeve 199 surrounding the sun gear. This sleeve is provided with an annular flange 200 between which flange and the disc 46 is arranged the spring 88. This sleeve is provided with rearwardly extending fingers 201 having reduced ends to provide shoulders on either side of the extended ends. The fingers proper are of just sufficient width to pass through arcuate openings in the disc 46. When the disc 46 is moved to the left, looking at Fig. 1, the spring 88 will press the flange 200 against the wall 23 of the casing, establishing a friction drag on the the sleeve 199, tending to brake the same against rotation. This will shift the sleeve 199 slightly around, presenting one of the shoulders in opposition to the disc 46. However, due to the slight braking action on the disc 46, there will be a reaction on the sun gear teeth 19 tending first to slow the sleeve 20 down against any rotative movement and then to move the sleeve 20 in a clockwise direction. This clockwise movement would be, of course, very slow and as soon as the disc 46 under this movement removes sufficiently to clear the shoulders of the fingers 201, the continued movement of the sleeve 20 to the left, looking at Fig. 1, would be permitted, engaging teeth 21 with teeth 22. However, when this engagement takes place, the sleeve 20 has practically come to a stop and there will be no clashing of the teeth when the parts are interengaged.

The operation of this structure is very similar to the operation of the blocker ring, heretofore described with respect to Fig. 21. Due to the braking of the sleeve 199, one of the shoulders on the sleeve will be presented against the disc 46 as the result of the relative movement between the sun gear sleeve 20, together with its associated disc 46 and the blocker sleeve 199. This will block the movement of the disc 46 to the left (looking at Fig. 1). As soon, however, as the shaft 3 is decelerated as the result of the operator's taking his foot from the accelerator, thus decelerating the cage 18, the sun gear sleeve 20 will be reversed and as the sleeve 199 is held stationary, the disc 46 will have a slight reverse movement to clear the shoulder of the fingers 201 from the disc and permit the disc and with the sun gear to move to the left (looking at Fig. 1), until the teeth 21 engage in the teeth 22.

Referring now to the structure illustrated in Fig. 12, it is to be noted that I provide in the teeth 20' grooves 202 and that I provide a sleeve 203 having teeth 204, fitting within this groove 202, these teeth being of the same width as the groove between splines 21'. While the teeth 204 are of the same width as the space between the splines 21' and are of a length to extend to the bottom of the space between the splines, it is to be noted that the grooves 202 in the sides of the spline 21' provide a wider spacing between the splines at this point, so that there can be a slight relative shifting movement between the fingers 204 and the splines. Accordingly, with the braking action of the flange 203 against the casing and a tendency of the sleeve 20' to rotate in a counter clockwise direction, when driving in direct drive, the fingers 204 will be moved in the grooves 202 behind the shoulders formed by the grooves in the side walls of the spline. Therefore, the fingers will tend to block the movement of the sleeve 20' to the left, looking at Fig. 12, under the action of the lever 129, preventing engagement of the splines or teeth 21' with the teeth 22'. As soon, however, as the operator removes his foot from the accelerator, thereby slowing down the engine and permitting a coasting of the vehicle, the sleeve 20 will be turned in a clockwise direction until the fingers 204 clear the shoulders formed by the grooves 202 in the side walls of the splines, thus permitting the continued movement of the sleeve 20 to engage teeth 21' with the sleeve 22', thus locking the sun gear against rotation.

Referring to Fig. 19, the blocker structure for the teeth 172 is substantially the same as that illustrated in Fig. 12. In the structure shown in Fig. 19, sleeve 235 has a flange 236 bearing on a portion with cage 169 under the bias of the spring 237. The sleeve 235 is provided with inturned spaced apart fingers 238 which pass between the teeth 239 on the sleeve 171. While in low speed indirect drive with the ring gear 168 rotating in a clockwise direction, the pinion cage 169 will be rotating in a clockwise direction, accordingly dragging the fingers in a clockwise direction, which will bring them opposite the teeth 239 and block the movement to the left (Fig. 19) of the sleeve 171. However, when the operator removes his foot from the accelerator pedal, to slow down the ring gear 168, the sleeve 171 will tend to drive in a counter clockwise direction, this being permitted by the release of the overrunning clutch until teeth 239 clear the fingers 237, permitting the sleeve 171 to be moved to the left (Fig. 19), by the motor 47 or motor 89. This movement to the left engages teeth 172 and 170', locking the parts and establishing high speed direct drive. In all of these structures, it will be noted that I provide a blocker mechanism for preventing the engagement of the brake for the sun gear until the sun gear has come substantially to rest or is moving only at a very slow rate of speed in the opposite direction, thus preventing the chattering or clashing of the interengaging members of the sun gear brake.

In Figs. 24 and 25, I have shown a further modification of my invention wherein the servo-motor for effecting a locking of the sun gear against rotation and therefore establish an overdrive, is shown as being a cylinder having a subatmospheric operated piston which cylinder is directly connected through a suitably controlled valve with the intake manifold of the engine.

As shown in Fig. 24, the cylinder 208 is provided with the piston 209. The piston rod 210 of this structure may be connected to the shift mechanism in the same manner as is the plunger 50 shown in Figs. 1 and 5 or the member 127 shown in Fig. 12 or the pullout rod 186 shown in Fig. 21. This cylinder 208 is connected through a conduit 211 and a control valve 212 with the intake manifold 213 of the engine and in such a manner that with the control valve open, subatmospheric pressure is admitted behind the piston 209 for shifting the sun gear brake mechanism into braking position.

The valve 212 is a complete unitary structure and is provided with a port 214 adapted to be controlled by a valve 215 which is mounted on the end of the movable solenoid core 216 of the solenoid 217. This solenoid is provided with a suitable winding 218 adapted not only to operate the core 216 for the purpose of controlling the valve 215 but also for the purpose of operating another core 219. This core is biased in its raised position by a coiled spring 220' and the core 219 carries at its upper end a contact 222 adapted to bridge, when in normal position, the two stationary contact members 221 and 220. It is obvious that when the solenoid 218 is energized, its core 216 will be raised, opening the port 214 and connecting the cylinder 208 with the intake manifold 213, so that the piston 209 under the influence of subatmospheric pressure will be moved to the left, looking at Fig. 24, to shift the braking mechanism for the sun gear into operative relationship and, as long as subatmospheric pressure exists in the cylinder 208, the sun gear will be braked against rotation and the overdrive established.

With the shutting off of communication between the cylinder 208 and the intake manifold 213, the subatmospheric pressure in the cylinder 208 will be reduced and the braking mechanism under the influence of spring 88, for instance, in Fig. 1, or a spring like spring 190 in Fig. 21, will move the braking mechanism into released position. In Fig. 25, I have illustrated, diagrammatically, a circuit arrangement for use in connection with the structure illustrated in Fig. 24. In this figure, the solenoid winding 218 is shown as having one terminal connected to the ground through a speed responsive switch 223 which may be, as is illustrated in Fig. 1 actuated by the governor 80, driven from the driven shaft on the drive shaft and is therefore responsive to the speed of the engine or to the speed of the driven shaft. Obviously, this speed responsive device may be driven from other parts as well as from the driven shaft.

The opposite terminal of the winding 218 is connected with a throttle controlled switch 224 which remains closed under normal operation of the throttle control member 86 as is the case in the other structures illustrated. This throttle control member, however, when moved beyond full open throttle position is adapted through a push rod 224′ to operate the switch 224 and move the same into open position. This switch 224 is connected through the ignition switch 225 of the engine ignition circuit with the battery 226. The opposite terminal of this battery is grounded.

The contact 220 is connected with one terminal of the battery 226 and the opposite contact 221 is connected with the ignition coil 227 and distributor 228 of the engine ignition system. It is also to be noted that the distributor and ignition coils are also connected by conductor 229 with a contact 230 of the switch 224.

In operation, as soon as the speed-responsive device, at predetermined speed, closes switch 223, the solenoid winding 218 will be energized, thereby raising the core 216 and opening the valve 215 thus admitting subatmospheric pressure to the cylinder 208 and establishing overdrive conditions. At the same time, the core 219 will be pulled down from its raised position opening contacts 220 and 221. By slightly closing the throttle 86, subatmospheric pressure, which has been admitted to cylinder 208 is increased sufficiently to move the sun gear brake into braking position. Thereafter, as long as the throttle member 86 is operated under normal conditions, the sun gear will be braked against rotation and the overdrive maintained in its established relation. It is to be remembered that with the overdrive established, there is sufficient thrust on the teeth of the overdrive brake to prevent them from being released unless, of course, coasting conditions be established in the vehicle. However, coasting conditions would only be established by the removing of the foot from the throttle 86 to reduce the speed of the engine and with the removal of the foot from the throttle, subatmospheric pressure in the piston 208 would be increased and therefore the brake still maintained in operative position.

Assuming, however, that it is desired to release the sun gear brake, the operator moves accelerator pedal 86 beyond full open throttle position. This, of course, operates the switch 230 opening the circuit of the windings 218 thereby permitting the valve 215 to close, shutting off subatmospheric pressure to the cylinder. It will be remembered that when winding 218 is energized, the circuit is opened between contacts 220 and 221. With the movement of the accelerator pedal beyond full open throttle position and the opening of the switch 224, the circuit through the ignition circuit of the engine will also be broken at the contact 230, thereby causing the engine to miss, thus relieving the thrust on the brake teeth of the sun gear brake and permitting the sun gear brake to move into released position. However, the opening of the circuit through the winding 218 will permit the core 219 to raise, thereby reestablishing the circuit between contacts 220 and 221 and the ignition circuit of the engine will thus be immediately reestablished, with the engine operating in the usual manner and the sun gear released to permit direct drive in the overdrive transmission.

Referring back to Fig. 2, it is to be noted that bell crank lever 38 is provided with an extension 38′ which is adapted to strike under certain conditions, the arm 79′ of the switch 79. This bell crank lever is adapted to be connected by a suitable cable connection 38″ with a handle 38‴ mounted preferably on the dash board. It is also to be noted that this bell crank lever 38 is connected with the rod 37. Therefore, when the handle 38‴ is manipulated to pull bell crank lever forward or to the left, looking at Fig. 2, it will shift the transmission mechanism into lock-up position, thereby locking out the overdrive and the free wheeling, and at the same time will operate the switch 79 to open the switch 79 (see Fig. 9) thereby opening the circuit of the solenoid winding 58 and thus preventing the overdrive shift mechanism from operating.

Likewise, the shift arm 27 is provided with an extension 27′ adapted to strike an arm 79″ of the switch 79 under predetermined conditions. The arrangement is such that when the arm 27 is shifted by driver control shift mechanism to establish low or second speed drive in the transmission, the arm 27′ will strike the arm 79″ also shifting the switch 79 into open position, thereby opening the circuit of the winding 58 and preventing operation of the overdrive.

Referring to Fig. 20, the engine throttle valve stem 230 is secured to a hollow sleeve 231. The operating rod 232, which is connected to the accelerator pedal 86 passes through the sleeve and interposed between the sleeve 231 and a fixed collar 233 on the rod 232 is a coiled spring 234. By this arrangement, opening movement of the accelerator pedal 86 is transmitted to the sleeve 231 and thus to the throttle 230 through the medium of the coil spring 234. However, when the throttle 230 has reached its wide open position and cannot move further, the accelerator pedal 86 and the rod 232 may continue in their movements further compressing the spring 234, the rod 232 sliding through the sleeve 231.

I claim as my invention:

1. In a power transmission for motor vehicles having an engine provided with an electrical ignition circuit and a driver manipulated throttle control member, a driving shaft adapted to receive the drive from said engine and a driven shaft adapted to drive the vehicle, driving means for driving the driven shaft from said driving shaft at one speed, driving means for driving said driven shaft from said driving shaft at a second speed, positively interengaging elements associated with at least one of said driving means adapted to move into engaged position to establish one of said drives and to move into disengaged position to establish the other of said drives, said elements when engaged being subjected to thrust transmission during the drive established by their engagement so as to resist disengagement of said elements to release this drive until the torque delivery of the driving shaft is interrupted, fluid pressure means for moving said interengaging elements into one position, separate means for moving said interengaging elements in the other position, speed responsive means for operating one of said means for moving the interengaging elements into engaged position, and means operated by said throttle control member for momentarily interrupting the engine ignition circuit and effecting the operation of the other of said element moving means to effect a disengagement of said interengaging elements.

2. In a power transmission for driving a motor vehicle having an internal combustion engine and a driver operable engine throttle control, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft and including positively interengaging elements associated with at least one of said driving means and adapted to move into disengaged position to establish said slow speed drive and to move into engaged position to establish said fast speed drive, said elements when engaged being subjected to thrust transmission during said relatively fast speed drive so as to resist disengagement of said elements to release the drive until the torque delivery of the driving shaft is momentarily interrupted, fluid pressure means for moving said interengaging elements into one position, means for moving said interengaging elements into the other position, speed responsive means for effecting the operation of one of said means for moving the interengaging elements into engaging position, and means operated upon the operation of said engine throttle control for momentarily interrupting said driving shaft torque delivery and operating one of said means for effecting the operation of one of said moving means to effect the disengagement of said interengaging elements.

3. In a power transmission for driving a motor vehicle having an internal combustion engine provided with an electrical ignition circuit and a driver manipulated throttle control, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft and including positively interengaging elements associated with at least one of said driving means and adapted to move into disengaged position to establish said slow speed drive and to move into engaged position to establish said fast speed drive, fluid pressure means for moving said interengaging elements into one position, means for moving said interengaging elements into the other position, speed responsive means for effecting the operation of one of said means for moving the interengaging elements into disengaged position, and means controlled by said throttle control for momentarily interrupting the engine ignition system to interrupt the torque delivery of said driving shaft for effecting the operation of one of said interengaging elements to disengage said interengaging elements.

4. In a motor vehicle transmission mechanism having a sun gear, pawl means operable to hold said sun gear to establish a modified driving speed, an electromagnetic system including a relay and a solenoid connected to actuate said pawl means, and a plurality of switches in series for controlling said electro-magnetic system, said switches being individually operable and similarly effective on the system.

5. In a motor vehicle transmission having a sun gear, positively interengaging elements operable to hold said sun gear to establish a modified driving speed, an electromagnetic system including a relay and a solenoid connected to actuate said elements, and a plurality of switches in series for controlling said electromagnetic system, said switches being individually operable and similarly effective on the system.

6. In a power transmission for driving a vehicle having an engine provided with a throttle valve; driver operated means for adjusting the engine throttle valve; a rotatable driving structure adapted to receive drive from the engine; a rotatable driven structure adapted to transmit drive from the driving structure for driving the vehicle; relatively slow speed driving means, including an overrunning device operably associated therewith, for driving the driven structure from the driving structure; relatively fast speed driving means, including a shiftable drive-controlling member operably associated therewith, for driving the driven structure from the driving structure at a speed ratio faster than that provided by said slow driving means; said device automatically overrunning in response to coast of the driving structure to allow the driven structure to overrun the driving structure; means operably associated with said shiftable member for controlling shift thereof as a function of the relative speeds of said structures such that said shiftable member is prevented from shifting to establish operation of said fast driving means during operation of said slow driving means but is free to shift to establish operation of said fast driving means during said coast of the driving structure; a motor operable to control shift of said shiftable member; motion transmitting means between the motor and said shiftable member so constructed and arranged that the motor may operate prior to drive-establishing shift of said shiftable member as aforesaid; and means operable in response to driver operation of said throttle valve adjusting means for coincidentally rendering said motor inoperative and momentarily interrupting delivery of power from the engine to the driving structure for unloading said shiftable member.

7. In a power transmission for driving a vehicle having an engine provided with a throttle valve; an accelerator pedal operable by the vehicle driver through a primary range of movement in adjusting the throttle valve from closed to open positions thereof, means providing a yielding abutment for said accelerator pedal when said accelerator pedal is moved to the limit of said primary range in throttle opening direction, said yielding abutment accommodating driver operation of said accelerator pedal beyond said limit for a secondary range of movement overtravelling the primary range; a rotatable driving structure adapted to receive drive from the engine; a rotatable driven structure adapted to transmit drive from the driving structure for driving the vehicle; relatively slow speed driving means, including an overrunning device operably associated therewith, for driving the driven structure from the driving structure; relatively fast speed driving means, including a shiftable drive-controlling member operably associated therewith, for driving the driven structure from the driving structure at a speed ratio faster than that provided by said slow driving means; said device automatically overrunning in response to coast of the driving structure to allow the driven structure to overrun the driving structure; means operably associated with said shiftable member for controlling shift thereof as a function of the relative speeds of said structures such that said shiftable member is prevented from shifting to establish operation of said fast driving means during operation of said slow driving means but is free to shift to establish operation of said fast driving means during said coast of the driving structure; a motor operable to control shift of said shiftable member; motion transmitting means between the motor and said shiftable member so constructed and arranged that the motor may operate prior to drive-establishing shift of said shiftable member as aforesaid; and means operable in response to driver operation of said accelerator pedal for said secondary over-travelling range for controlling operation of said motor.

8. In a power transmission for driving a vehicle having an engine provided with a throttle valve; an accelerator pedal operable by the vehicle driver through a primary range of movement in adjusting the throttle valve from closed to open positions thereof; means providing a yielding abutment for said accelerator pedal when said accelerator pedal is moved to the limit of said primary range in throttle-opening direction, said yielding abutment accommodating driver operation of said accelerator pedal beyond said limit for a secondary range of movement overtravelling the primary range; a rotatable driving structure adapted to receive drive from the engine; a rotatable driven structure adapted to transmit drive from the driving structure for driving the vehicle; relatively slow speed driving means, including an overrunning device operably associated therewith, for driving the driven structure from the driving structure; relatively fast speed driving means, including a shiftable drive-controlling member operably associated therewith, for driving the driven structure from the driving structure at a speed ratio faster than that provided by said slow driving means; said overrunning device automatically overrunning in response to coast of the driving structure to allow the driven structure to overrun the driving structure; means operably associated with said shiftable member for controlling shift thereof as a function of the relative speeds of said structures such that said shiftable member is prevented from shifting to establish operation of said fast driving means during operation of said slow driving means but is free to shift to establish operation of said fast driving means during said coast of the driving structure; a motor operable to control shift of said shiftable member; motion transmitting means between the motor and said shiftable member so constructed and arranged that the motor may operate prior to drive-establishing shift of said shiftable member as aforesaid; and means operable in response to driver operation of said accelerator pedal for said secondary overtravelling range for coincidentally rendering said motor inoperative and momentarily grounding the ignition system of the engine for unloading said shiftable member.

9. In a power transmission for driving a vehicle having an engine; a transmission drive-controlling element operable from a first position to a second position for effecting a change in the transmission drive; a motor operable to control operation of said element from its said first position to its said second position and adapted to be rendered inoperative thereby to accommodate return of said element to its said first position; means urging said return of said element when said motor is rendered inoperative; vehicle driver controlled means operable to render said motor inoperative; means operable as an incident to rendering said motor inoperative as aforesaid for interrupting normal operation of the engine; and means acting to restore the engine for normal operation as an incident to operation of said element from its said second position to its said first position.

10. In a power transmission for driving a vehicle having an engine; change speed means including a shiftable member operable to effect change in the transmission speed ratio; fluid pressure actuated means for controlling operation of said change speed means; solenoid operated means for controlling operation of said fluid pressure means; speed controlled means for effecting energization and deenergization of said solenoid; and means operable by the vehicle driver for effecting energization and deenergization of said solenoid, and locking means controlled by said solenoid for locking said shiftable member against shifting movement out of its pressure fluid actuated position.

11. In a power transmission for driving a vehicle having an engine; a transmission drive controlling element operable from a first position to a second position for effecting a change in the transmission drive; a vacuum motor operable to control operation of said element from its said first position to its said second position and adapted to be rendered inoperative thereby to accommodate return of said element to its said first position; means operating to releasably hold said element in its said second position independently of vacuum; means urging said return of said element when said vacuum motor is rendered inoperative; vehicle driver controlled means operable to render said vacuum motor inoperative and effect release of said holding means; means operable in response to rendering said vacuum motor inoperative as aforesaid for effecting reduction in the delivery of power by the engine; and means acting to restore the engine for normal power delivery as an incident to operation of said element from its said second position to its said first position.

12. In a power transmission for driving a vehicle having an engine; a transmission drive-controlling element operable from a first position to a second position for effecting a change in the transmission drive; a vacuum motor operable to control operation of said element from its said first position to its said second position and adapted to be rendered inoperative, thereby to accommodate return of said element to its said first position; means operating to releasably hold said element in its said second position independently of vacuum; means urging said return of said element when said vacuum motor is rendered inoperative; vehicle driver controlled means operable to render said vacuum motor inoperative and effect release of said holding means; means operable in response to rendering said vacuum motor inoperative as aforesaid for effecting reduction in the normal delivery of power by the engine; and means acting to restore the engine for normal power delivery as an incident to operation of said element-return-means.

13. In a power transmission for driving a vehicle having an engine; a transmission drive-controlling element operable from a first position to a second position for effecting a change in the transmission drive; a vacuum operated motor operable to control operation of said element from its said first position to its said second position and adapted to be vented and thereby rendered inoperative so as to accommodate return of said element to its said first position; means operating to releasably hold said element in its said second position independently of vacuum; means urging said return of said element when said motor is vented and when said holding means is released; means for venting said motor and releasing said holding means; means operating in response to venting said motor and releasing said holding means for effecting reduction in the normal delivery of power by the engine whereby said urging means may operate to effect said return of said element; and means acting to restore the engine for normal power delivery as an incident to said operation of said urging means.

14. In a power transmission for motor vehicles, a driving shaft adapted to receive a drive from the engine and a driven shaft adapted to drive the vehicle, driving means for driving the driven shaft from said driving shaft at one speed, driving means for driving said driven shaft from said driving shaft at another speed, positively interengaging elements associated with at least one of said driving means, at least one of which elements is adapted to move into a position of engagement with the other of said elements to establish one of said drives and to move into a position of disengagement from said other element to enable the establishment of the other of said drives, said elements when engaged being subjected to torque so as to resist disengagement of said elements to release the said one drive, pressure differential means for moving said one interengaging element into one position, means for moving said one interengaging element into the other position, speed responsive means for effecting the operation of one of said means for moving the said one interengaging element into a position of engagement with the other of said interengaging elements and driver controlled means for momentarily interrupting the torque and enabling the other of said interengaging element moving means for moving the said one interengaging element to effect disengagement of said interengaging elements.

15. In a power transmission for motor vehicles having an internal combustion engine and a driver operable engine throttle control member, a driving shaft adapted to receive a drive from the engine and a driven shaft adapted to drive the vehicle, driving means for driving the driven shaft from said driving shaft at one speed, driving means for driving said driven shaft from said driving shaft at another speed, positively interengaging elements associated with at least one of said driving means and at least one of which elements is adapted to move into a position of engagement with the other of said elements to establish one of said drives and to move into a position of disengagement from said other element to enable the establishment of the other of said drives, said elements when engaged being subjected to torque so as to resist disengagement of said elements to release the said one drive, fluid pressure means for moving said one interengaging element into one position, means for moving said one interengaging element into the other position, speed responsive means for effecting the operation of one of said interengaging elements, and means operated by said throttle control member for momentarily interrupting the torque and enabling the other of said means to move the said one interengaging element to effect the disengagement of said interengaging elements.

16. In a power transmission for driving a vehicle having an engine; a rotatable driving structure adapted to receive drive from the engine; a rotatable driven structure adapted to transmit drive from the driving structure for driving the vehicle; means including positively interengageable drive control members adapted, when interengaged, to establish a drive relationship between said structures; motor means comprising a movable thrust transmitting member adapted, when operated by power of the motor means, for thrusting movement from one position thereof thereby to bias one of said drive control members for movement from one position thereof toward interengagement with the other of said drive control members; spring means providing a lost-motion spring connection between said movable thrust transmitting member and said movable drive control member such that thrust of said movable thrust transmitting member, when operated by said motor means, is transmitted through said spring means to said movable drive control member for biasing said movable drive control member as aforesaid; spring means for effecting return movement of said movable drive control member to its said one position and said movable thrust transmitting member to its said one position; and means operable to momentarily unload said drive control members thereby to facilitate said return movement of said movable drive control member, including a control device operable for controlling said unloading means and means for effecting operation of said control device in response to movement of one of said movable members in the direction of its said return movement.

17. In a power transmission for an automotive vehicle having an engine of the type equipped with an ignition system; a driving shaft adapted to receive drive from the engine; a driven shaft adapted to drive the vehicle; means including positively interengageable drive control elements adapted, when interengaged, to establish a drive relationship between said shafts; spring means biasing one of said interengaging control elements to disengaging relation with respect to the other to release said drive relationship; motor means including a power element movable with a power stroke in one direction to provide thrust for moving and holding said one control element into interengaging relation with the other for establishing and maintaining said drive relationship, said spring means beng operably assocated with said power element to effect return movement of said power element; and means for so controlling the ignition system as to effect momentary interruption of the ignition system thereby to facilitate movement of said one control element to said disengaging relation by said spring means, including a switch for controlling the ignition system and means for effecting an operation of said switch in response to movement of said power element.

18. In a power transmission for an automotive vehicle having an engine; a driving shaft adapted to receive drive from the engine; a driven shaft adapted to drive the vehicle; means including positively interengageable drive control elements adapted, when interengaged, to establish a drive relationship between said shafts; spring means biasing one of said interengaging control elements to disengaging relation with respect to the other to release said drive relationship; motor means including a power element movable with a power stroke in one direction to provide thrust for moving and holding said one control element into interengaging relation with the other for establishing and maintaining said drive relationship, said spring means being operably associated with said power element to effect return movement of said power element; and means operable to momentarily unload said drive control elements, when interengaged, thereby to facilitate movement of said one control element to said disengaging relation by said spring means, including a switch for controlling said unloading means and means for effecting an operation of said switch in response to movement of said power element.

19. In a power transmission for an automotive vehicle having an engine; a driving shaft adapted to receive drive from the engine; a driven shaft adapted to drive the vehicle; means including positively interengageable drive control elements adapted, when interengaged, to establish a drive relationship between said shafts; motor means having a power operated member operable to provide thrust for moving one of said interengaging control elements into interengaging relation with the other for establishing said drive relationship; thrust transmitting means comprising a spring between said power operated member and said one control element, said spring being so arranged as to transmit the thrust from said power operated member to said one control element when said power operated member is operated as aforesaid; spring means for effecting return movement of said one control element and said power operated member; and means operable to momentarily unload said drive control elements thereby to facilitate movement of said one control element to disengaging relation, including a switch for controlling said unloading means and means for effecting an operation of said switch in response to movement of said power operated member.

20. In a power transmission for driving a motor vehicle having an internal combustion engine and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including a positively engageable drive control element operably associated therewith and adapted when engaged to establish said relatively fast speed drive, said element when engaged being subjected to driving thrust during said relatively fast speed drive so as to resist disengagement of said element to release this drive until the power delivery of the engine is momentarily interrupted; said relatively slow speed driving means including a control device operating automatically to establish this drive in response to release of said relatively fast speed driving means; electromagnet controlled means adapted to effect engagement and disengagement of said element thereby to respectively establish and release said relatively fast speed driving means; and means operating in response to driver operation of said throttle control for de-energizing said electromagnet and for momentarily interrupting the power delivery of said engine thereby to step-down the drive through the transmission by effecting release of said relatively fast speed driving means and operation of said relatively slow speed driving means.

21. In a power transmission for driving a motor vehicle having an internal combustion engine and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including positively engageable drive control elements operably associated therewith and adapted when engaged to establish said relatively fast speed drive, one of said drive control elements being movable relative to the other to establish and release said relatively fast speed drive, said elements when engaged being subjected to thrust transmission therebetween during said relatively fast speed drive so as to resist disengagement of said elements to release this drive until the power delivery of the engine is momentarily interrupted; said relatively slow speed driving means including a control device operating automatically to establish this drive in response to release of said relatively fast speed driving means; electromagnet controlled motor means adapted upon energization of said electromagnet to move said relatively movable drive control element for controlling operation of said relatively fast speed driving means; means yieldingly opposing movement of said relatively movable drive control element by said motor means; and means operating in response to driver operation of said throttle control for deenergizing said electromagnet and for effecting momentary interruption of the power delivery of said engine thereby causing said motor means to operate to step-down the drive through the transmission by effecting release of said relatively fast speed driving means and operation of said relatively slow speed driving means.

22. In a power transmission for driving a motor vehicle having an internal combustion engine and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including positively engageable drive control elements operably associated therewith and adapted when engaged to establish said relatively fast speed drive, one of said drive control elements being movable relative to the other to establish and release said relatively fast speed drive, said elements when engaged being subjected to thrust transmission therebetween during said relatively fast speed drive so as to resist disengagement of said elements to release this drive until the power delivery of the engine is momentarily interrupted; said relatively slow speed driving means including a control device operating automatically to establish this drive in response to release of said relatively fast speed driving means; electromagnet controlled motor means adapted upon energization of said electromagnet to move said relatively movable drive control element for controlling operation of said relatively fast speed driving means; means yieldingly opposing movement of said relatively movable drive control element by said motor means; and means operating in response to driver operation of said throttle control for deenergizing said electromagnet and for effecting momentary interruption of the power delivery of said engine thereby causing said motor means to operate to stepdown the drive through the transmission by effecting release of said relatively fast speed driving means and operation of said relatively slow speed driving means; a second change speed mechanism associated with said driving and driven shafts and means operatively associated with said second change speed mechanism for controlling energization of said electromagnet.

23. In a power transmission for driving a motor vehicle having an engine provided with a throttle valve; a driving shaft adapted to receive drive from the engine; a driven shaft adapted to drive the vehicle; an overrunning clutch; means for driving the driven shaft from the driving shaft independently of said clutch at a relatively fast speed and releasable to accommodate a further drive from the driving shaft to the driven shaft through said clutch relatively slower than said relatively fast speed drive; means for driving the driven shaft from the driving shaft at said relatively slow speed drive; said overrunning clutch being included in said slow driving means and being operable therein to establish the relatively slow speed drive upon release of said fast driving means; drive control means including an electromagnet adapted upon energization thereof to so control said drive control means as to effect establishment of said fast speed drive; driver operated means for adjusting the engine throttle valve; and drive control means operable in response to operation of said throttle valve adjusting means for deenergizing said electromagnet thereby to release said fast speed drive.

24. In a power transmission for driving a motor vehicle having an internal combustion engine and a driver manipulated throttle control; a driving shaft adapted to receive drive from the engine and a driven shaft adapted to drive from said driving shaft, means including planetary gearing operable between said shafts for driving the driven shaft from the driving shaft at the speed of the driving shaft or at an overspeed relatively thereto, said gearing including a rotatable control gear adapted to be held from rotation to provide said overspeed drive and to be released for rotation to release said overspeed drive and establish the slower drive; a non-rotatably mounted pawl selectively operable to a position for holding said control gear against rotation or to a position for releasing said control gear for rotation; a spring operably associated with said pawl for biasing said pawl toward its said releasing position; an electromagnet coil adapted to be electrically energized; means operating as a result of energizing of said coil for effecting operation of said pawl toward its said holding position; means conditioned upon the vehicle attaining a predetermined speed for effecting energization of said coil; means for unloading thrust between said pawl and said control gear to facilitate operation of said pawl by said spring toward said releasing position; and means operating in response to driver manipulation of said throttle control in throttle opening direction for effecting deenergization of said coil and accompanying operation of said thrust unloading means.

25. In a motor vehicle drive having a rotatable driving structure adapted to receive drive from the engine and a rotatable driven structure adapted to transmit drive from the driving structure for driving the vehicle; relatively slow speed driving means, including an overrunning device operably associated therewith, for driving the driven structure from the driving structure; relatively fast speed driving means, including a shiftable drive-controlling member operably associated therewith, for driving the driven structure from the driving structure at a speed ratio faster than that provided by said slow driving means; said device automatically overrunning in response to coast of the driving structure to allow the driven structure to overrun the driving structure; means operably associated with said shiftable member for controlling shift thereof as a function of the relative speeds of said structures such that said shiftable member is prevented from shifting to establish operation of said fast driving means during operation of said slow driving means but is free to shift to establish operation of said fast driving means during said coast of the driving structure; a power-actuated operator operable to control shift of said shiftable member; and motion transmitting means between the operator and said shiftable member so constructed and arranged that the operator may operate prior to drive-establishing shift of said shiftable member as aforesaid.

26. In a motor vehicle drive having a rotatable driving structure adapted to receive drive from the engine and a rotatable driven structure adapted to transmit drive from the driving structure for driving the vehicle; relatively slow speed driving means, including an overrunning device operably associated therewith, for driving the driven structure from the driving structure; relatively fast speed driving means, including a shiftable drive-controlling member operably associated therewith, for driving the driven structure from the driving structure at a speed ratio faster than that provided by said slow driving means; said device automatically overrunning in response to coast of the driving structure to allow the driven structure to overrun the driving structure; means operably associated with said shiftable member for controlling shift thereof as a function of the relative speeds of said structures such that said shiftable member is prevented from shifting to establish operation of said fast driving means during operation of said slow driving means but is free to shift to establish operation of said fast driving means during said coast of the driving structure; a power-actuated operator operable to control shift of said shiftable member; motion transmitting means between the operator and said shiftable member so constructed and arranged that the operator may operate prior to drive-establishing shift of said shiftable member as aforesaid; a plurality of independently operable control means at least one of which is adapted for operation by the vehicle driver; and means for rendering said operator inoperative in response to operation of each of said plurality of control means.

27. In a power transmission for driving a vehicle having an engine provided with a throttle valve; driver operated means for adjusting the engine throttle valve; a rotatable driving structure adapted to receive drive from the engine; a rotatable driven structure adapted to transmit drive from the driving structure for driving the vehicle; relatively slow speed driving means, including an overrunning device operably associated therewith, for driving the driven structure from the driving structure; relatively fast speed driving means, including a shiftable drive-controlling member operably associated therewith, for driving the driven structure from the driving structure at a speed ratio faster than that provided by said slow driving means; said device automatically overrunning in response to coast of the driving structure to allow the driven structure to overrun the driving structure; means operably associated with said shiftable member for controlling shift thereof as a function of the relative speeds of said structures such that said shiftable member is prevented from shifting to establish operation of said fast driving means during operation of said slow driving means but is free to shift to establish operation of said fast driving means during said coast of the driving structure; a motor operable to control shift of said shiftable member; motion transmitting means between the motor and said shiftable member so constructed and arranged that the motor may operate prior to drive-establishing shift of said shiftable member as aforesaid; and means operable in response to driver operation of said throttle valve adjusting means for controlling operation of said motor.

28. In a motor vehicle having an engine and a throttle control therefore, a transmission including positively interengageable elements adapted when engaged to establish a drive of one ratio, said elements being freely disengageable only when the transmission of torque therebetween is interrupted, means yieldingly urging one of said elements toward its disengaged position, a motor, yielding means interposed between the motor and said one element, adapted under energized action of said motor to urge said one element toward its engaged position, electrically controlled means for holding said one element in engaged position, means controlled by the throttle control means for momentarily interrupting the ignition of said engine to remove the torque load on said one element, said holding means being arranged to respond to the ignition interrupting movement of said throttle control so as to release said one element for movement to disengaged position during the interruption of the ignition.

29. In a power transmission for driving a motor vehicle having an internal combustion engine provided with an electrical ignition circuit and a driver manipulated throttle control, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft and including positively interengaging elements associated with at least one of said driving means and adapted to move into disengaged position to enable said slow speed driving means to establish said slow speed drive and to move into engaged position to establish said fast speed drive, fluid pressure means for moving said interengaging elements into one position, means for moving said interengaging elements into the other position, speed responsive means for effecting the operation of one of said means for moving the interengaging elements into disengaged position, and means controlled by said throttle control for momentarily interrupting the engine ignition system to interrupt the torque delivery of said driving shaft for effecting the operation of one of said interengaging elements to disengage said interengaging elements.

30. In a power transmission for an automotive vehicle having an engine, a driving shaft adapted to receive a drive from the engine, a driven shaft adapted to drive the vehicle, a first driving means for driving said driven shaft from said driving shaft, a second driving means for driving said driven shaft at a speed different from that of the first driving means and including positively interengaging drive control elements adapted to establish, when engaged, said second drive, said first driving means including a control device operating automatically to establish this drive in response to the release of said second driving means, means biasing said interengaging elements to disengaging relation to establish said first drive, a motor having a power element operable upon energization of said motor for moving said interengaging elements into engaging relation for establishing said second drive, a source of power for the motor, motor control means, and speed responsive means operated independently of said power source for actuating said motor control means to effect the energizing of said motor by power from said power source.

31. In a power transmission for driving a motor vehicle having an engine, a driving shaft adapted to receive a drive from the engine and a driven shaft adapted to drive the vehicle, first driving means for driving the driven shaft from the driving shaft, second driving means for driving the driven shaft from the driving shaft at a speed different from said slow speed driving means and including positively interengaging drive control elements operatively associated therewith and adapted when engaged to establish said second drive, said first driving means including a control device operating automatically to establish this drive in response to release of said second driving means, means biasing said interengaging elements into disengaging relation to establish said first drive, motor means having a power element operable upon energization of said motor means for moving said interengaging elements into engaging relation for establishing said second drive, speed responsive means operable to effect energization of said motor means, and driver controlled means for deenergizing said motor means independently of said speed responsive means and for interrupting the delivery of power from the engine, to effect disengagement of said interengaging elements.

32. In a power transmission for driving a motor vehicle having an engine, a driving shaft adapted to receive a drive from the engine and a driven shaft adapted to drive the vehicle, first driving means for driving the driven shaft from the driving shaft, second driving means for driving the driven shaft from the driving shaft at a speed different from said slow speed driving means and including positively interengaging drive control elements operatively associated therewith and adapted when engaged to establish said second drive, said first driving means including a control device operating automatically to establish this drive in response to release of said second driving means, means biasing said interengaging elements into disengaging relation to establish said first drive, a motor having a power element operable upon energization of said motor for moving said interengaging elements into engaging relation for establishing said second drive, motor control means, speed responsive means for actuating said motor control means to energize said motor, and driver controlled means for deenergizing said motor independently of said speed responsive means and for interrupting the delivery of power from the engine, to effect disengagement of said interengaging elements.

33. The invention set forth in claim 32 with the addition that said engine has an ignition system, said means for interrupting the delivery of power from the engine comprising means for disabling the ignition system.

34. The invention set forth in claim 33 with the addition of means operated by the disengagement of said interengaging elements for restoring the ignition system to operability.

35. In a power transmission for driving a motor vehicle having an engine, a driving shaft adapted to receive a drive from the engine and a driven shaft adapted to drive the vehicle, first driving means for driving the driven shaft from the driving shaft, second driving means for driving the driven shaft from the driving shaft at a speed different from said first driving means and including positively interengaging drive control elements operatively associated therewith and adapted when engaged to establish said second drive, said first driving means including a control device operating automatically to establish this drive in response to release of said second driving means, means biasing said interengaging elements into disengaging relation to establish said first drive, a motor for moving said interengaging elements into engaging relation for establishing said second drive, a source of power for the motor, motor control means, speed responsive means independent of said power source operable above a predetermined speed for actuating said motor control means to interconnect said power source and motor to effect the energization of said motor and operable upon a speed decrease to below said predetermined speed for actuating said motor control means to disconnect said power source and motor to effect the deenergization of said motor, and driver controlled means for deenergizing said motor independently of said speed responsive means and for interrupting the delivery of power from the engine, to effect disengagement of said interengaging elements.

36. In a power transmission for an automotive vehicle having an engine of the type equipped with an ignition system; a driving shaft adapted to receive drive from the engine; a driven shaft adapted to drive the vehicle; means including positively interengageable drive control elements adapted, when interengaged, to establish a drive relationship between said shafts; spring means biasing one of said interengaging control elements to disengaging relation with respect to the other to release said drive relationship; motor means having a power element operable upon energization of said motor means for moving said one control element into interengaging relation with the other for establishing said drive relationship; and means for so controlling the ignition system as to effect momentary interruption of the ignition system thereby to facilitate movement of said one control element to said disengaging relation by said spring means, including switch means for controlling the ignition system and means for effecting an operation of said switch means with the functioning of said motor means.

37. The invention set forth in claim 36 wherein the operation of said switch means is controlled by operation of said motor means.

38. The invention set forth in claim 36 wherein the operation of said switch means is controlled by relative movement of said interengaging elements upon the functioning of the motor means.

39. The invention set forth in claim 36 with the addition of speed responsive means for controlling the functioning of said motor means.

40. The invention set forth in claim 36 with the addition of control means for the motor means, and speed responsive means for controlling the functioning of said control means.

41. The invention set forth in claim 22 wherein the transmission including said positively engageable drive control elements comprises a planetary transmission, and said second change speed mechanism comprises a multispeed manually controlled transmission.

42. In a power transmission for driving a vehicle having an engine provided with a throttle and a driver manipulated throttle-controlling member; a transmission drive-controlling element operable from a first position to a second position for effecting a change in the transmission drive; a motor operable to control operation of said element from its said first position to its said second position and adapted to be rendered inoperative by movement of said driver manipulated member in throttle-opening direction, thereby to accommodate return of said element when said motor is rendered inoperative; and means operable by said driver manipulated member while in a position wherein said motor is inoperative for momentarily interrupting power delivery of the engine.

43. In a power transmission for driving a motor vehicle having an internal combustion engine and a driver manipulated throttle control; a driving shaft adapted to receive drive from the engine and a driven shaft adapted to drive from said driving shaft; planetary gearing operable between said shafts for driving the driven shaft from the driving shaft at an overspeed relatively thereto; said gearing including a rotatable control gear adapted to be held from rotation to provide said overspeed drive and to be released for rotation to release said overspeed drive; holding means selectively operable to hold said control gear against rotation or to release said control gear for rotation, means for effecting said selective operation of said holding means with respect to said control gear, electrically operated control means adapted upon energization to so control said operating means for said holding means as to thereby effect said holding operation of said holding means and upon de-energization to effect said releasing operation to release said holding means; speed responsive means for controlling energization of said electrical control means; and means operable in response to manipulation of said throttle control for controlling energization of said electrical control means.

44. In a power transmission for driving a motor vehicle having an internal combustion engine and a driver manipulated throttle control; a driving shaft adapted to receive drive from the engine and a driven shaft adapted to drive from said driving shaft, means including planetary gearing operable between said shafts for driving the driven shaft from the driving shaft at the speed of the driving shaft or at an overspeed relatively thereto, said gearing including a rotatable control gear adapted to be held from rotation to provide said overspeed drive and to be released for rotation to release said overspeed drive and establish the slower drive; holding means selectively operable to hold said control gear against rotation or to release said control gear for rotation, and means for selectively controlling operation of said holding means with respect to said control gear, said means including a solenoid adapted upon energization thereof to cause operation of said holding means and upon deenergization thereof to effect release of said holding means; and means operably associated with said throttle control for controlling interruption of the power delivery of said engine and for controlling deenergizing of said solenoid upon manipulation of said throttle control.

45. In a power transmissin for driving a vehicle having an engine; change speed means including a shiftable member operable to effect change in the transmission speed ratio; fluid pressure actuated means for controlling operation of said change speed means; electromagnet means for controlling operation of said fluid pressure means; speed controlled means for effecting energization and deenergization of said electromagnet means; and means operable by the vehicle driver for effecting energization and deenergization of said electromagnet means, said electromagnet means including means to hold said shiftable member against shifting movement when said electromagnet means is energized.

46. In a power transmission for an automotive vehicle having an engine, a driving shaft adapted to receive a drive from the engine, a driven shaft adapted to drive the vehicle, a relatively slow speed driving means for driving said driven shaft from said driving shaft, a relatively fast speed driving means driving said driven shaft at a speed greater than that of the slow speed driving means and including positively interengaging drive control elements adapted to establish, when engaged, said fast speed drive, said relatively slow speed driving means including a control device operating automatically to establish this drive in response to the release of said relatively fast speed driving means, means biasing said interengaging elements to disengaging relation to establish said relatively slow speed drive, a motor operable when energized to move and hold said interengaging elements into engaging relation for establishing said fast speed drive, means including a switch for controlling said motor, and speed responsive means for actuating said switch to cause energization of said motor.

47. In a power transmission for driving a motor vehicle having an engine, a driving shaft adapted to receive a drive from the engine and a driven shaft adapted to drive the vehicle, relatively slow speed driving means for driving the driven shaft from the driving shaft, relatively fast speed driving means for driving the driven shaft from the driving shaft at a speed greater than said slow speed driving means and including positively interengaging drive control elements operatively associated therewith and adapted when engaged to establish said fast speed drive, said relatively slow speed driving means including a control device operating automatically to establish this drive in response to release of said relatively fast speed driving means, means biasing said interengaging elements into disengaging relation to establish said relatively slow speed drive, a motor operable when energized to move and hold said interengaging elements into engaging relation for establishing said fast speed drive, means including a switch for controlling said motor, speed responsive means for actuating said switch to cause energization of said motor, and driver controlled means for interrupting the delivery of power from the engine and for deenergizing said motor independently of said speed responsive means.

48. In a power transmission for an automotive vehicle having an engine; a driving shaft adapted to receive drive from the engine; a driven shaft adapted to drive the vehicle; means including positively interengageable drive control elements adapted, when interengaged, to establish a drive relationship between said shafts; spring means biasing one of said interengaging control elements to disengaging relation with respect to the other to release said drive relationship; motor means having a power element operable upon energization of said motor means for moving said one control element into interengaging relation with the other for establishing said drive relationship; a source of power for the motor; motor control means; and speed responsive means operated independently of said power source for actuating said motor control means to effect the energizing of said motor by power from said power source; and means providing a yielding connection between said power element of the motor and said one control element.

49. The invention set forth in claim 46 wherein the motor effects operation of said interengaging elements by means providing a yielding connection.

50. The invention set forth in claim 47 wherein the motor effects operation of said interengaging elements by means providing a yielding connection.

51. In a power transmission for driving an automotive vehicle having an engine, a driving shaft adapted to receive drive from the engine, a driven shaft adapted to drive the vehicle, relatively slow speed driving means for driving the driven shaft from the driving shaft, relatively fast speed driving means for driving the driven shaft from the driving shaft and including positively interengageable drive control elements adapted when engaged to establish the relatively high speed drive, said relatively slow speed driving means including a device operating automatically to establish the relatively low speed drive in response to disengagement of said drive control elements, a motor having a power-operated member movable upon energization of the motor from a first position to a second position for shifting one of said interengaging elements into engagement with the other and upon deenergization of the motor from said second position to said first position for shifting said shifting control element out of engagement with the other control element, force transmitting means including a spring providing a lost-motion connection between said shifting control element and said power operated member permitting said power operated member to shift from one of said positions toward the other in advance of shift of said shifting control element, a driver-operated device, and means responsive at least in part to the speed of the vehicle, said driver-operated device and said speed responsive means acting jointly to control said motor.

52. The invention of claim 51 with the addition that said motor is a fluid motor operable by a differential in fluid-pressure.

53. The invention of claim 51 with the addition that said motor is an electromagnetic motor.

54. The invention set forth in claim 42 with the addition that said motor is a vacuum motor.

55. In a power transmission for an automotive vehicle having an engine; a driving shaft adapted to receive drive from the engine; a driven shaft adapted to drive the vehicle; means including positively interengageable drive control elements adapted, when interengaged, to establish a drive relationship between said shafts; motor means having a power operated member operable for moving one of said drive control elements into interengaging relation with the other for establishing said drive relationship; thrust transmitting means comprising a spring between said power operated member and said one control element, said spring being so arranged as to transmit the thrust from said power operated member to said one control element when said power operated member is operated as aforesaid; and means operable to momentarily unload said drive control elements thereby to facilitate movement of said one control element out of engagement with the other, including a switch for controlling said unloading means and means for effecting an operation of said switch in response to functioning of said motor means.

56. In a power transmission for driving a vehicle having an engine; means operable to effect change in the transmission speed ratio; electromagnet operated means for controlling operation of said change speed means; speed controlled means for effecting energization and deenergization of said electromagnet; a control element operable by the vehicle driver; and means operable in response to operation of said control element for simultaneously effecting momentary interruption of the normal power delivery of the engine and deenergization of said electromagnet.

57. In an automobile provided with an engine and a change-speed transmission, said engine having an ignition system, a transmission-control member shiftable between first and second positions, yielding means urging said member toward said first position, a power-actuated operator including a power member movable from a first position to a second position on power-activation of the operator and from said second to said first position on deactivation of the operator, a connection between said power member and said transmission-control member, said power member being operable through said connection upon the application of power to shift said transmission-control member from its first to its second position, and ignition-controlling means for cutting the ignition system into and out of operation and including a switch operable upon movement of said control member into and out of its said first position, said connection being a lost-motion connection permitting said power member to return from its second to its first position while the transmission control member remains in its second position.

58. The invention set forth in claim 57 with the addition that said operator is a fluid motor actuated by a differential in fluid-pressure.

References Cited in the file of this patent

UNITED STATES PATENTS

| | | |
|---|---|---|
| Re. 21,844 | Vetter | June 24, 1941 |
| 1,069,995 | Anderson | Aug. 12, 1913 |
| 1,078,127 | Coleman | Oct. 11, 1913 |
| 1,131,218 | Dewson | Mar. 9, 1915 |
| 1,185,528 | Oddie | May 30, 1916 |
| 1,455,697 | Yonge | May 15, 1923 |
| 1,467,664 | Yonge | Sept. 11, 1923 |
| 1,655,896 | Ferguson | Jan. 10, 1928 |
| 1,745,307 | Mason | Jan. 28, 1930 |
| 1,836,813 | Rankin | Dec. 15, 1931 |
| 1,839,145 | Forichon | Dec. 29, 1931 |
| 1,988,636 | Thomas | Jan. 22, 1935 |
| 1,991,939 | Howsam | Feb. 19, 1935 |
| 2,023,018 | Hamilton | Dec. 3, 1935 |
| 2,039,186 | Pieper | Apr. 28, 1936 |
| 2,045,500 | Thurber | June 23, 1936 |
| 2,071,165 | Harper | Feb. 16, 1937 |
| 2,097,021 | De Normanville | Oct. 26, 1937 |
| 2,115,212 | Padgett | Apr. 26, 1938 |
| 2,177,872 | Dunn | Oct. 31, 1939 |
| 2,322,479 | Schjolin | June 22, 1943 |